US012748427B2

(12) United States Patent
Li et al.

(10) Patent No.: US 12,748,427 B2
(45) Date of Patent: Sep. 29, 2026

(54) UNMANNED AERIAL VEHICLE, CONTROL TERMINAL, AIRCRAFT RESCUE METHOD, AND AIRCRAFT RESCUE SYSTEM

(71) Applicant: SZ DJI TECHNOLOGY CO., LTD., Shenzhen (CN)

(72) Inventors: Luochuan Li, Shenzhen (CN); Wuyang Duan, Shenzhen (CN); Zhimeng Shang, Shenzhen (CN); Ximin Lv, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 253 days.

(21) Appl. No.: 18/470,824

(22) Filed: Sep. 20, 2023

(65) Prior Publication Data

US 2024/0019873 A1 Jan. 18, 2024

Related U.S. Application Data

(63) Continuation of application No. PCT/CN2021/084509, filed on Mar. 31, 2021.

(51) Int. Cl.
*G05D 1/00* (2024.01)
*B64U 10/10* (2023.01)
(Continued)

(52) U.S. Cl.
CPC ........... *G05D 1/0808* (2013.01); *B64U 10/10* (2023.01); *B64U 10/14* (2023.01); *B64U 30/20* (2023.01);
(Continued)

(58) Field of Classification Search
CPC .................................................... G05D 1/0808
See application file for complete search history.

(56) References Cited

U.S. PATENT DOCUMENTS 10,198,956 B2 * 2/2019 Silverman ................ G08G 5/55
11,754,696 B2 * 9/2023 Sequeira ................ G05D 1/104 701/3

(Continued)

FOREIGN PATENT DOCUMENTS

CN 104097767 A 10/2014
CN 106143888 A 11/2016

(Continued)

OTHER PUBLICATIONS

Bevacqua, "Mixed-Initiative Planning and Execution for Multiple Drones in Search and Rescue Missions", Proceedings of the Twenty-Fifth International Conference on Automated Planning and Scheduling, DIETI, Universita degli Studi di Napoli Federico II 2015 (Year: 2015).*

(Continued)

*Primary Examiner* — Jean Paul Cass
(74) *Attorney, Agent, or Firm* — ANOVA LAW GROUP, PLLC

(57) ABSTRACT

An unmanned aerial vehicle includes a body, at least two rotors rotatably disposed at the body, and at least one processor. Each rotor is configured to provide a first thrust in a first direction when rotating in a forward direction and a second thrust in a second direction opposite to the first direction when rotating in a reverse direction. The at least one processor is configured to, in response to the body being in a to-be-rescued attitude, determine whether the at least two rotors are capable of conducting rescue, and in response to determining that only one or more first rotors being capable of conducting rescue, control to perform a rescue operation by controlling the one or more first rotors to provide the second thrust and controlling one or more second rotors other than the one or more first rotors to stop rotating.

20 Claims, 25 Drawing Sheets

(51) Int. Cl.
*B64U 10/14* (2023.01)
*B64U 30/20* (2023.01)
*B64U 50/13* (2023.01)
*B64U 50/23* (2023.01)

(52) U.S. Cl.
CPC ............. *B64U 50/13* (2023.01); *B64U 50/23* (2023.01); *B64U 2201/10* (2023.01); *B64U 2201/20* (2023.01)

(56) References Cited

U.S. PATENT DOCUMENTS

| | | | | |
|---|---|---|---|---|
| 12,054,279 | B2 * | 8/2024 | Burke | B64D 41/00 |
| 2014/0091172 | A1 * | 4/2014 | Arlton | B64U 50/19<br>244/17.23 |
| 2016/0023755 | A1 | 1/2016 | Elshafei et al. | |
| 2017/0015417 | A1 * | 1/2017 | Bishop | B64U 10/20 |
| 2018/0351634 | A1 | 12/2018 | Ryan et al. | |
| 2019/0220039 | A1 | 7/2019 | Wu et al. | |
| 2020/0031438 | A1 * | 1/2020 | Moses | G01S 5/0231 |
| 2024/0425177 | A1 * | 12/2024 | File | B64C 11/30 |

FOREIGN PATENT DOCUMENTS

| | | | | |
|---|---|---|---|---|
| CN | 108839795 | A | 11/2018 | |
| CN | 106032166 | B | 12/2018 | |
| CN | 108958279 | A | 12/2018 | |
| CN | 109071001 | A | 12/2018 | |
| CN | 109476372 | A | 3/2019 | |
| CN | 209719911 | U | 12/2019 | |
| CN | 111056015 | A | 4/2020 | |
| CN | 112158329 | A | 1/2021 | |
| EP | 3984851 | A1 * | 4/2022 | B64C 19/02 |
| KR | 20170061884 | A | 6/2017 | |
| KR | 102740958 | B1 * | 12/2024 | B64U 10/16 |

OTHER PUBLICATIONS

The World Intellectual Property Organization (WIPO) International Search Report for PCT/CN2021/084509 Dec. 24, 2021 5 pages (Including English translation).

* cited by examiner

UNMANNED AERIAL VEHICLE, CONTROL TERMINAL, AIRCRAFT RESCUE METHOD, AND AIRCRAFT RESCUE SYSTEM

CROSS-REFERENCE TO RELATED APPLICATION

This application is a continuation of International Application No. PCT/CN2021/084509, filed Mar. 31, 2021, the entire content of which is incorporated herein by reference.

TECHNICAL FIELD

The present disclosure relates to the field of unmanned aerial vehicles and, more particularly, to an unmanned aerial vehicle, a control terminal, an aircraft rescue method, and an aircraft rescue system.

BACKGROUND

An unmanned aerial vehicle (UAV) can be used in many fields such as aerial photography, aerial surveillance, monitoring, or reconnaissance. A multi-rotor unmanned aerial vehicle is a special unmanned aircraft with three or more rotor shafts. In the multi-rotor unmanned aerial vehicle, an electric motor corresponding to each rotor shaft drives a corresponding rotor to rotate, to generate thrust.

After the multi-rotor unmanned aerial vehicle falls abnormally during flight, it may have a large roll on the ground, and may be unable to take off normally. If the multi-rotor unmanned aerial vehicle is far away from an operator, or if it falls on somewhere not easy reachable by human, such as a roof or another side of a river, it will be more difficult or even impossible to rescue the aircraft.

SUMMARY

In accordance with the disclosure, there is provided an unmanned aerial vehicle including a body, at least two rotors rotatably disposed at the body, and at least one processor. Each of the at least two rotors is configured to provide a first thrust in a first direction when rotating in a forward direction and provide a second thrust in a second direction opposite to the first direction when rotating in a reverse direction. The at least one processor is configured to, in response to the body being in a to-be-rescued attitude, determine whether the at least two rotors are capable of conducting rescue, and in response to determining that only one or more first rotors of the at least two rotors being capable of conducting rescue, control to perform a rescue operation by controlling the one or more first rotors to provide the second thrust and controlling one or more second rotors of the at least two rotors other than the one or more first rotors to stop rotating.

Also in accordance with the disclosure, there is provided an aircraft rescue method including receiving a rescue control instruction to rescue an aerial vehicle. The aerial vehicle includes a body and at least two rotors rotatably arranged at the body and each configured to provide a first thrust in a first direction when rotating in a forward direction and provide a second thrust in a second direction opposite to the first direction when rotating in a reverse direction. The method further includes, in response to the body being in a to-be-rescued attitude, determining whether the at least two rotors are capable of conducting rescue, and in response to determining that only one or more first rotors of the at least two rotors being capable of conducting rescue, controlling to perform a rescue operation, including controlling the one or more first rotors to provide the second thrust and controlling one or more second rotors of the at least two rotors other than the one or more first rotors to stop rotating.

Also in accordance with the disclosure, there is provided an aircraft rescue system including an aerial vehicle and a control terminal. The aerial vehicle includes a body, at least two rotors rotatably disposed at the body, and at least one processor. Each of the at least two rotors is configured to provide a first thrust in a first direction when rotating in a forward direction and provide a second thrust in a second direction opposite to the first direction when rotating in a reverse direction. The control terminal includes a communication interface configured to send a rescue control instruction to the aerial vehicle, where the rescue control instruction instructs the aerial vehicle to perform a rescue operation when the body is in a to-be-rescued attitude. The at least one processor is configured to, in response to the body being in the to-be-rescued attitude, determine whether the at least two rotors are capable of conducting rescue; and in response to determining that only one or more first rotors of the at least two rotors being capable of conducting rescue, control to perform the rescue operation by controlling the one or more first rotors to provide the second thrust and controlling one or more second rotors of the at least two rotors other than the one or more first rotors to stop rotating.

DETAILED DESCRIPTION OF THE EMBODIMENTS

The technical solutions of the present disclosure will be described below in conjunction with the drawings in the embodiments of the present disclosure. Obviously, the described embodiments are some of the embodiments of the present disclosure, but not all of the embodiments. Based on the embodiments in this disclosure, all other embodiments obtained by those of ordinary skill in the art without creative work shall fall within the scope of this disclosure.

In the field of aerial vehicles, when an aerial vehicle rolls over, falls abnormally, or lands after rolling, how to rescue the aircraft is an urgent problem to be solved. The descriptions below use unmanned aerial vehicles as an example, but are also generally applicable to other types of aerial vehicles.

For a multi-rotor unmanned aerial vehicle, after the multi-rotor unmanned aerial vehicle falls abnormally because of problems such as propeller scratches or collisions during flight, the ground attitude of the multi-rotor unmanned aerial vehicle may have a larger roll angle than the normal take-off attitude. Therefore, the multi-rotor unmanned aerial vehicle may not be able to take off normally.

The multi-rotor unmanned aerial vehicle may be far away from an operator or located in a position where it is not easy to rescue the aircraft. For example, the drop location may be on a roof, on the other side of a river, and other places that are not easy to reach. This may make it more difficult to rescue the aircraft, and may even cause the loss of the multi-rotor unmanned aerial vehicle because of the inability to rescue the multi-rotor unmanned aerial vehicle. The above problems generally exist for remotely controlled rotor unmanned aerial vehicles.

The present disclosure provides an unmanned aerial vehicle, a control terminal, an aircraft rescue method, and an aircraft rescue system, to at least partially alleviate the above problem. In the present disclosure, each of at least two rotors may be capable of providing reverse thrust (such as thrust to keep the bottom-up unmanned aerial vehicle away from the landing surface) when rotating in a reverse direction. Therefore, when the multi-rotor unmanned aerial vehicle is in a to-be-rescued attitude (also referred to as a "target attitude" in this disclosure) and the rescue operation is able to be performed, the unmanned aerial vehicle may be able to respond to the rescue control instruction and control the working state of at least one or more of the rotors to perform the rescue operation. For example, at least one or more of the rotors may be controlled remotely to make the multi-rotor unmanned aerial vehicle change from the to-be-rescued attitude (which is a non-take-off attitude) to the take-off attitude or directly take off with reverse thrust in the to-be-rescued attitude. The embodiments of the present disclosure may effectively reduce the difficulty of the aircraft rescue, reduce the risk of property loss of users, and improve user experience.

Figure 1:
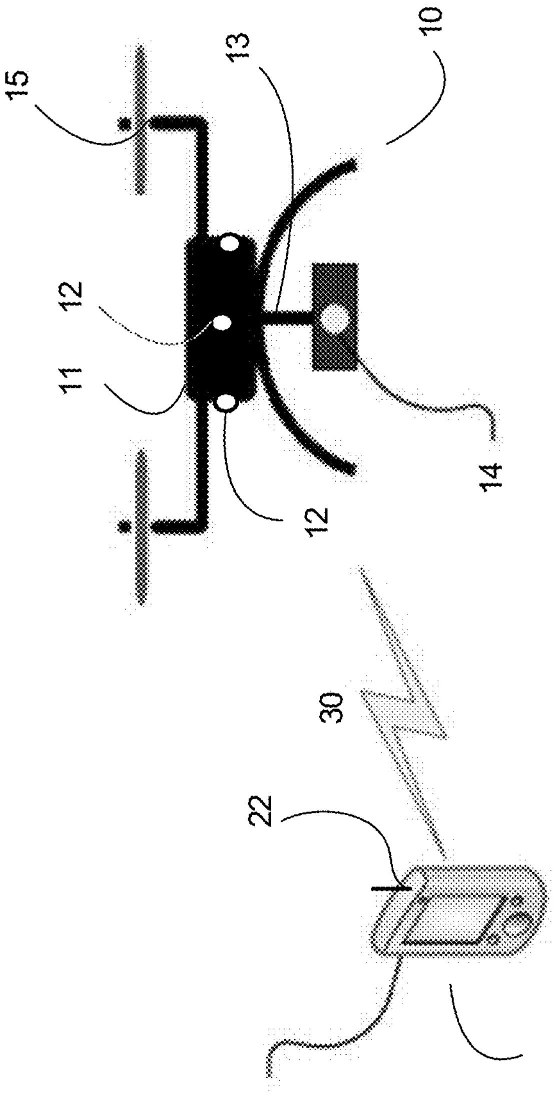
FIG. 1 is a schematic diagram showing an application scenario of an unmanned aerial vehicle, a control terminal, an aircraft rescue method, and an aircraft rescue system consistent with the present disclosure.

FIG. 1 is a schematic diagram showing an application scenario of an unmanned aerial vehicle, a control terminal, an aircraft rescue method, and an aircraft rescue system provided by one embodiment of the present disclosure. In the example shown in FIG. 1, the unmanned aerial vehicle 10 being a multi-rotor unmanned aerial vehicle is used as an example to illustrate the present disclosure, which does not limit the scope of the present disclosure.

The unmanned aerial vehicle 10 includes a body 11, a carrier 13, and a load 14. Although the unmanned aerial vehicle 10 is described as an aircraft, such description is not limiting and any type of unmanned aerial vehicles described above is applicable. In some embodiments, the load 14 may be located directly on the unmanned aerial vehicle 10 without the carrier 13. The unmanned aerial vehicle 10 may include power mechanisms 15 and a sensing system 12. The unmanned aerial vehicle 10 may also include a communication system.

The power mechanisms 15 may include one or more rotating bodies, propellers, paddles, engines, motors, bearings, magnets, or nozzles. For example, a rotating body of the power mechanisms may be a self-tightening rotating body, a rotating body assembly, or another rotating body power unit. The unmanned aerial vehicle may include two, three, four or more power mechanisms. In one embodiment, all the power mechanisms may be of the same type. In some other embodiments, at least one of the powered mechanisms may be of a different type than the other powered mechanisms. The power mechanisms 15 may be mounted on the unmanned aerial vehicle by suitable means, such as via a supporting element (such as a drive shaft). The power mechanisms 15 may be installed at any suitable positions of the unmanned aerial vehicle 10, such as the top, the bottom, the front, the rear, the side, or any combination thereof.

In some embodiments, the power mechanisms 15 may be configured to enable the unmanned aerial vehicle 10 to take off vertically from a surface, or land vertically on a surface, without requiring any horizontal movement of the unmanned aerial vehicle 10 (e.g., without taxiing on a runway). Optionally, the power mechanisms 15 may allow the unmanned aerial vehicle 10 to hover at a preset position and/or direction in the air. One or more of the powered mechanisms 15 may be controlled independently of other powered mechanisms. Optionally, one or more of the power mechanisms 15 may be controlled simultaneously. For example, the unmanned aerial vehicle 10 may include a plurality of horizontally oriented rotors to control lifting and/or propulsion of the unmanned aerial vehicle. The plurality of horizontal rotors may be actuated to provide the unmanned aerial vehicle 10 with the ability to take off vertically, land vertically, or hover. In some embodiments, one or more of the plurality of horizontal rotors may rotate clockwise, while the other one or more of the plurality of horizontal rotors may rotate counterclockwise. For example, a number of rotors that rotate clockwise may be same as a number of rotors that rotate counterclockwise. A rotation speed of each of the plurality of horizontal rotors may be changed independently to realize the lift and/or push maneuvers driven by each rotor to adjust the spatial orientation, velocity, and/or acceleration of the unmanned aerial vehicle 10 (for example, rotation or translation in up to three degrees of freedom).

The sensing system 12 may include one or more sensors to sense surrounding obstacles, spatial orientation, velocity, and/or acceleration (e.g., rotation and translation with respect to up to three degrees of freedom) of the unmanned aerial vehicle 10. The one or more sensors may include previously described sensors, including but not limited to ranging sensors, GPS sensors, motion sensors, inertial sensors, or image sensors. Sensing data provided by the sensing system 12 may be used to control the spatial orientation, velocity, and/or acceleration of the unmanned aerial vehicle 10. Optionally, the sensing system 12 may be used for environment data of the unmanned aerial vehicle 10, such as weather conditions, distances to surrounding obstacles, locations of geographic features, locations of man-made structures, and the like.

The carrier 13 may be one of a variety of supporting structures, including but not limited to: fixed brackets, detachable brackets, structures with adjustable attitude, etc., for setting the load 14 on the body 11. For example, the carrier 13 may be a gimbal, and the load 14 may be a photographing device. The gimbal may be able to allow the photographing device to be displaced relative to the body 11, or to rotate about one or more axes. For example, the carrier 13 may allow the photographing device to achieve a combined translational motion along one or more of the pitch, yaw, and roll axes. For another example, the carrier 13 may allow the photographing device to rotate around one or more axes of the pitch axis, the yaw axis, and the roll axis.

The communication system may be configured to realize the communication between the unmanned aerial vehicle 10 and the control terminal 20 with another communication system through a wireless signal 30 sent and received by an antenna 22 arranged at a casing 21. The communication system may include any number of transmitters, receivers, and/or transceivers for wireless communication. Communication may be unidirectional so that data is sent in one direction. For example, one-way communication may include that only the unmanned aerial vehicle 10 transmits data to the control terminal 20, or vice versa. One or more transmitters of the communication system may send data to one or more receivers of the communication system, and vice versa. Optionally, the communication may be two-way communication, such that data may be transmitted in both directions between the unmanned aerial vehicle 10 and the control terminal 20. Two-way communication may involve that one or more transmitters of the communication system send data to one or more receivers of the communication system, and vice versa.

The load 14 may be used to realize functions such as: observation, reconnaissance, tracking, targeting, liquid (such as water, pesticide, etc.) spraying, transportation, etc. The load 14 may include but is not limited to at least one of, a photographing device, a fire extinguishing device, an aiming device, a pesticide spraying device, a recording device, a cabinet, etc.

In some embodiments, the control terminal 20 may provide control instructions to one or more of the unmanned aerial vehicle 10, the carrier 13, or the load 14, and receive information (such as position and/or movement information of obstacles, the unmanned aerial vehicle 10, the carrier 13, or the load 14, data sensed by the load such as image data captured by a camera) from one or more of the unmanned aerial vehicle 10, the carrier 13, or the load 14. In some embodiments, the control data of the control terminal 20 may include instructions about position, movement, braking, or control of the unmanned aerial vehicle 10, the carrier 13, and/or the load 14. For example, the control data may result in a change in the position and/or orientation of the unmanned aerial vehicle 10 (e.g., by controlling the power mechanisms 15), or cause movement of the carrier 13 relative to the unmanned aerial vehicle 10 (e.g., by controlling the carrier 13). The control data of the control terminal 20 may result in load control, such as controlling the operation of a camera or other image capture devices (including capturing still or moving images, zooming, turning on or off, switching imaging modes, changing image resolution, changing focal length, changing depth of field, changing exposure time, changing viewing angle or field of view). In some embodiments, the communication between the unmanned aerial vehicle 10, the carrier 13, and/or the load 14 may include information from one or more sensors (such as a distance sensor or an image sensor of the load 14). Communications may include sensory information transmitted from one or more sensors of different types, such as GPS sensors, motion sensors, inertial sensors, proximity sensors, or image sensors. The sensing information may be about the position (such as direction, position), motion, or acceleration of the unmanned aerial vehicle 10, the carrier 13 and/or the load 14. The sensing information communicated from the load 14 may include data captured by the load 14 or the status of the load 14. The control data transmitted and provided by the control terminal 20 may be used to control the status of one or more of the unmanned aerial vehicle 10, the carrier 13, or the load 14. Optionally, one or more of the carrier 13 or the load 14 may include a communication circuit for communicating with the control terminal 20 such that the control terminal is able to communicate with or control the unmanned aerial vehicle 10, the carrier 13 or the load 14 individually.

In some embodiments, the unmanned aerial vehicle 10 may be able to communicate with other remote devices other than the control terminal 20. The control terminal 20 may also be able to communicate with another remote device and the unmanned aerial vehicle 10. For example, the unmanned aerial vehicle 10 and/or the control terminal 20 may communicate with another unmanned aerial vehicle or a carrier or a load of another unmanned aerial vehicle. The additional remote device may be a second terminal or another computing device (such as a computer, a desktop computer, a tablet computer, a smart phone, or another mobile device) when desired. The remote device may transmit data to the unmanned aerial vehicle 10, receive data from the unmanned aerial vehicle 10, transmit data to the control terminal 20, and/or receive data from control terminal 20. Optionally, the remote device may be connected to the Internet or other telecommunication network to enable uploading of data received from the unmanned aerial vehicle 10 and/or the control terminal 20 to a website or server.

The sensors may be used to collect information about the unmanned aerial vehicle 10. Different types of sensors may sense different kinds of signals or sense signals from different sources. For example, the sensors may include inertial sensors, GPS sensors, distance sensors, or vision/image sensors (such as cameras). The sensors may be connected with a processing unit including one or more processors, such that the processing unit may introduce the obstacle information from the sensors into the obstacle avoidance calculation to determine the expected speed of the unmanned aerial vehicle. In some embodiments, the sensors may be connected to a communication system (such as a Wi-Fi image transmission circuit) for directly transmitting sensing data to an appropriate external device or system. For example, a communication system may be used to transmit images captured by an image sensor to a remote terminal.

Figure 2:
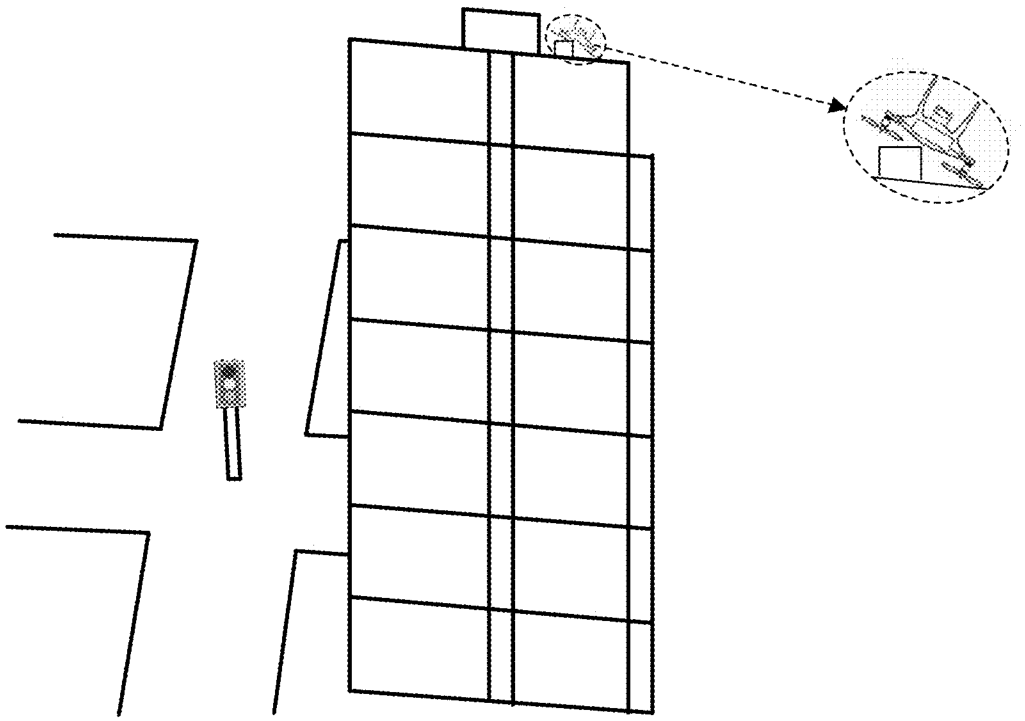
FIG. 2 is a schematic diagram showing another application scenario of an unmanned aerial vehicle, a control terminal, an aircraft rescue method, and an aircraft rescue system consistent with the present disclosure.

FIG. 2 is a schematic diagram showing an application scenario of an unmanned aerial vehicle, a control terminal, an aircraft rescue method, and an aircraft rescue system provided by one embodiment of the present disclosure.

As shown in FIG. 2, when a user is using the unmanned aerial vehicle for operations, such as photographing or inspection, the unmanned aerial vehicle may crash because of interference with obstacles or the impact of gusts, etc., causing the unmanned aerial vehicle to be unable to take off in the normal attitude. In some scenarios, for example, it may not be convenient for the user to rescue the aircraft when it is not convenient for human access.

Take the multi-rotor unmanned aerial vehicle as an example. In existing technologies, when the multi-rotor unmanned aerial vehicle takes off and flies normally, the attitude tilt angle cannot be too large, otherwise the thrust generated by the forward rotation of the rotors cannot make the multi-rotor unmanned aerial vehicle take off. If the propellers are forced to start, it may even cause a series of dangerous situations such as the propellers scratching the ground or the unmanned aerial vehicle flying too close to the ground. For example, the embodiments of the present disclosure may be used to solve the problem that the multi-rotor unmanned aerial vehicle cannot take off normally when the multi-rotor unmanned aerial vehicle is far away from the operator and rolls over or falls, which easily leads to the loss of the multi-rotor unmanned aerial vehicle.

The unmanned aerial vehicle, the control terminal, the air craft rescue method and the aircraft rescue system provided by the embodiments of the present disclosure may be able to adjust the attitude of the multi-rotor unmanned aerial vehicle to the normal take-off attitude when the ground tilt angle is large, such that the multi-rotor unmanned aerial vehicle may be able to take off in the normal take-off attitude. In addition, when the ground tilt angle is too large (for example, the body flips about 150-210°), the multi-rotor unmanned aerial vehicle may be able to take off in the to-be-rescued attitude.

Figure 3:
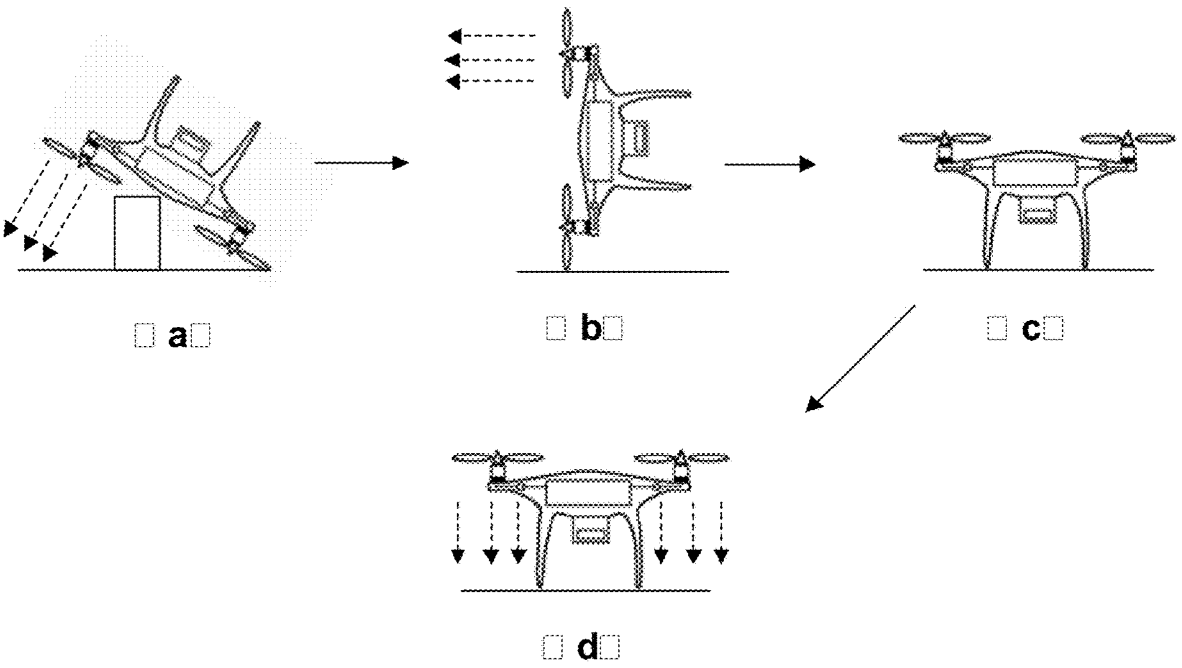
FIG. 3 is a schematic diagram showing another application scenario of an unmanned aerial vehicle, a control terminal, an aircraft rescue method, and an aircraft rescue system consistent with the present disclosure.

FIG. 3 is a schematic diagram showing an application scenario of an unmanned aerial vehicle, a control terminal, an aircraft rescue method, and an aircraft rescue system provided by one embodiment of the present disclosure.

As shown in part (a) of FIG. 3, when the multi-rotor unmanned aerial vehicle is in the to-be-rescued attitude, for example, when there is interference between at least one or more of the propellers and the landing surface or the angle between the body and the landing surface is too large, one or more of the propellers that are not in interference with the landing surface are controlled to provide thrust that causes the body to roll. For example, the one or more of the propellers that do not interfere with the landing surface may be controlled to rotate in the reverse direction to provide thrust that moves the propellers away from the landing surface.

As shown in part (b) and part (c) of FIG. 3, the rotors providing reverse thrust causes the body to roll and convert to the normal take-off attitude. It should be noted that the rotors providing thrust cannot interfere with the landing surface, and the rotors not providing thrust may or may not interfere with the landing surface.

As shown in part (d) of FIG. 3, when the multi-rotor unmanned aerial vehicle is in the normal take-off attitude, it may perform the take-off operation in response to control instructions.

When the roll angle of the multi-rotor unmanned aerial vehicle relative to the landing surface is large, such as larger than 45°, 60°, 90°, 120°, 150°, 180°, 200°, or even larger, the above method may make the multi-rotor unmanned aerial vehicle return to the attitude that can take off normally in a large probability, to complete the rescue operation.

Figure 4:
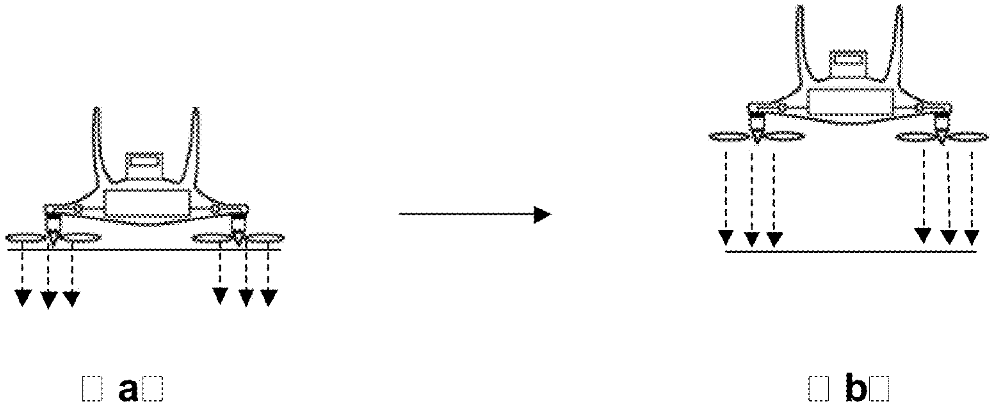
FIG. 4 is a schematic diagram showing another application scenario of an unmanned aerial vehicle, a control terminal, an aircraft rescue method, and an aircraft rescue system consistent with the present disclosure.
Figure 5:
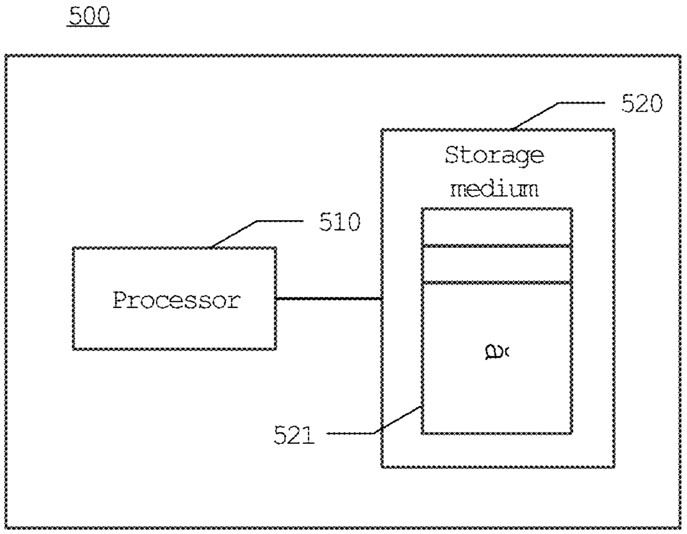
FIG. 5 is a schematic diagram of an unmanned aerial vehicle consistent with the present disclosure.

FIG. 4 is a schematic diagram showing an application scenario of an unmanned aerial vehicle, a control terminal, an aircraft rescue method, and an aircraft rescue system provided by one embodiment of the present disclosure.

As shown in part (a) of FIG. 4, in some special scenarios, it may not be convenient to rescue the aircraft by flipping the aircraft as shown in part (a) to part (d) of FIG. 3. For example, the multi-rotor unmanned aerial vehicle may be located in a relatively narrow space, or it may be not convenient to provide the multi-rotor unmanned aerial vehicle with thrust in a specific direction, such that the multi-rotor unmanned aerial vehicle may be unable to roll over to realize the rescue operation. For example, the multi-rotor unmanned aerial vehicle may roll 180° relative to the landing surface, and the rotors may not interfere with the landing surface (e.g. the rotors are in the middle of the attachment shafts instead of the top, or there is something else on the side of the rotors facing outward relative to the body such that there is no interference between the rotors and the landing surface, etc.). As shown in part (b) of FIG. 4, in this scenario, one or more rotors may be controlled to rotate in the reverse direction to provide thrust relative to the landing surface, such that the multi-rotor unmanned aerial vehicle may take off with an attitude flipped about 180° relative to the normal take-off attitude. Therefore, the rescue process in special scenarios may be realized through the above method.

For description purpose only, the multi-rotor unmanned aerial vehicle is used as an example to illustrate the present disclosure, and should not be understood as a limitation to the technical solution of the present disclosure. For example, the above-mentioned rescue process may also be applied to unmanned aerial vehicles using jet power, unmanned aerial vehicles using motors or engines as power sources, unmanned aerial vehicles using magnetic force as power sources, etc., which is not limited here.

In one embodiment, the unmanned aerial vehicle may include: a body and at least two rotors. The at least two rotors may be rotatably arranged at the body. Each of the at least two rotors may provide a first thrust in a first direction when rotating in a forward direction, and each of the at least two rotors may provide a second thrust in a second direction when rotating in a reverse direction. The first direction may be opposite to the second direction. A number of the at least two rotors may be 2, 3, 4, 8 or more.

In one embodiment, the body may include a sensor assembly for collecting sensory data. The at least two rotors may be respectively and rotatably arranged at different positions of the body, such as respectively arranged at four vertices or arms of the body far away from each other. The rotation directions of the at least two rotors in forward rotation may be the same or different. For example, two diagonal rotors may have the same rotation direction, and the rotation directions of two adjacent rotors may be opposite. The rotation direction of the at least two rotors in reverse rotation may be opposite to that of the forward rotation. The first direction may be a direction making the rotors away from the landing surface when the multi-rotor unmanned aerial vehicles is in the normal take-off attitude. The second direction may be a direction making the rotors that need to provide thrust away from the landing surface when the multi-rotor unmanned aerial vehicles is in the to-be-rescued attitude.

Specifically, the body may include a sensor assembly for collecting sensor data, and the sensor assembly may include at least one of an inertial measurement unit (IMU) or an image sensor. The IMU may be respectively arranged at the body and the bracket (such as a gimbal), and the image sensor may be fixed on the bracket rotatably using a shooting device.

When the body is in the to-be-rescued attitude and the unmanned aerial vehicle is able to perform the rescue operation, at least one or more of the at least two rotors may provide the second thrust in response to the rescue control instruction to perform the rescue operation. For example, the rescue operation may make the multi-rotor unmanned aerial vehicle roll over to convert to the normal take-off attitude, or make the multi-rotor unmanned aerial vehicle take off directly in the to-be-rescued attitude.

For example, the unmanned aerial vehicle has a rescue mode. In the rescue mode, when the attitude information determined based on the sensor data indicates that the body is in the to-be-rescued attitude and indicates that the unmanned aerial vehicle is able to perform the rescue operation, at least one or more of the at least two rotors may provide the second thrust in response to the rescue control instruction, to execute the rescue operation.

In one embodiment, when the unmanned aerial vehicle is in the to-be-rescued attitude, a projection of the direction of the resultant force of the thrust provided by the at least two rotors when they are rotating in the forward direction to the vertical line passing through the center of gravity of the unmanned aerial vehicle may point to the center of the earth, and/or, the propellers of the at least two rotors may interfere with the landing surface in the current attitude. For example, the angle between the direction of the resultant force of the thrust provided by the at least two rotors when they are rotating in the forward direction and the direct vertical line is less than or equal to 30°.

In one embodiment, when the unmanned aerial vehicle is able to perform rescue operation, the propellers of at least one or more of the at least two rotors may be able to rotate forward or reversely, and the propellers of at least one or more of the at least two rotors may be separated from the landing surface in the current attitude. Therefore, the probability of damage to the rotors due to the interference between the rotors and the landing surface during the rescue process may be effectively reduced. In this way, it may be convenient to control the rotors satisfying the rescue operation in the to-be-rescued attitude, to realize the rescue operation.

The following is an example description of some performance requirements that a multi-rotor unmanned aerial vehicle needs to meet.

In one aspect, the respective forward and reverse directions of the at least two rotors may be determined based on the respective propeller angles of the at least two rotors. For example, the multi-rotor unmanned aerial vehicle may obtain thrust through the rotation of the propellers, and the direction of rotation of each propeller may be determined according to the propeller angle of the propeller to ensure that the propeller generates thrust when the angle of attack is positive when rotating. In the embodiments of the present disclosure, it is assumed that the rotation direction of the propeller to generate upward thrust is forward rotation, and the rotation direction of the propeller to generate downward pull force is reverse rotation. When the multi-rotor unmanned aerial vehicle is in normal flight control, each propeller may rotate forward to generate upward thrust. However, when the attitude of the unmanned aerial vehicle is in a rolling state, the forward rotation may cause the unmanned aerial vehicle to generate a downward force, and the unmanned aerial vehicle may be unable to take off normally at this time. It is necessary to generate an upward thrust by controlling the propellers to rotate in reverse, such that the attitude of the unmanned aerial vehicle is adjusted to the normal take-off attitude.

On the one hand, controlling the propellers to rotate in reverse to perform flip rescue of the unmanned aerial vehicle may be divided into two categories. One type is manual flip rescue, and the other is automatic flip rescue. In the manual flip rescue, according to the direction and magnitude of the manual stick operation instruction, motor reverse instruction with corresponding direction and magnitude may be output to realize the flip of the unmanned aerial vehicle. In the automatic flip rescue, the multi-rotor unmanned aerial vehicle may automatically select corresponding motors according to the current attitude rollover situation to perform the flip rescue operation. The control mode of the automatic flip rescue may be divided into open-loop instruction control and closed-loop instruction control.

In some embodiments, the manual flip rescue may need connection with the multi-rotor unmanned aerial vehicle through a remote control to achieve remote control or through an application (app) virtual joystick to achieve remote control. In some embodiments, the automatic flip rescue may be triggered by a remote control, an app trigger or a remote control equipment such as flight glasses.

On the one hand, the embodiments of the present disclosure may require an electric speed controller of the multi-rotor unmanned aerial vehicle to support forward rotation and reverse rotation.

In one embodiment, at least one or more of the at least two rotors may provide the second thrust in response to the first control instruction, such that the body changes from the to-be-rescued attitude to the normal take-off attitude. Specifically, as shown in part (a) to part (d) of FIG. 3, at least one or more of the at least two rotors are controlled to provide reverse thrust such that the multi-rotor unmanned aerial vehicle rolls and is converted to the normal take-off attitude.

In one embodiment, first one or more of the at least two rotors may respectively provide the first thrust in response to the first control instruction, and second one or more of the at least two rotors may respectively provide the second thrust in response to the first control instruction. Specifically, in the process of providing the second thrust, as shown in part (a) and part (b) of FIG. 4, by controlling at least one or more of the at least two rotors to provide reverse thrust, the multi-rotor unmanned aerial vehicle may take off with the at least two rotors facing downward relative to the body, to realize the rescue operation.

It should be noted that the at least two rotors may be powered by a motor, a fuel engine, etc. The motor and the fuel engine may be controlled by designated control units. For example, at least one of the rotation direction, rotation speed, or rotation duration of the motor may be controlled by an electric speed controller. The electric speed controller may include one or more processors to process the collected data and output control signals for the motor. In addition, the unmanned aerial vehicle may also have one or more other processors to realize the control of the gimbal, operating equipment, and the like.

In one embodiment, the unmanned aerial vehicle may have a rescue mode, and the rescue mode may include at least one of a manual rescue mode, an automatic rescue mode, and an automatic rescue-and-return mode. In the manual rescue mode, rotors that need to be rotated, the speed of rotation, and the selected duration may be input by the user. For example, through the control terminal connected to the unmanned aerial vehicle, the received user operations may be converted into control instructions and sent to the unmanned aerial vehicle. In the automatic rescue mode, only the trigger event of entering the automatic mode may be required. For example, the user may input a user operation corresponding to entering the automatic mode on the control terminal. The trigger event of the automatic rescue-and-return mode may be similar to that of the automatic rescue mode. In this mode, after the rescue is successfully completed, the unmanned aerial vehicle may perform the automatic return operation.

In one embodiment, the unmanned aerial vehicle may further include a communication interface for communicating with the control terminal. Correspondingly, the rescue control instruction may be acquired by the communication interface of the unmanned aerial vehicle from the communication interface of the control terminal. For the communication system, reference may be made to the description of relevant parts in FIG. 1.

For description purpose only, an X-configuration quadrotor unmanned aerial vehicle will be used as an example to illustrate the present disclosure below.

Figure 6:
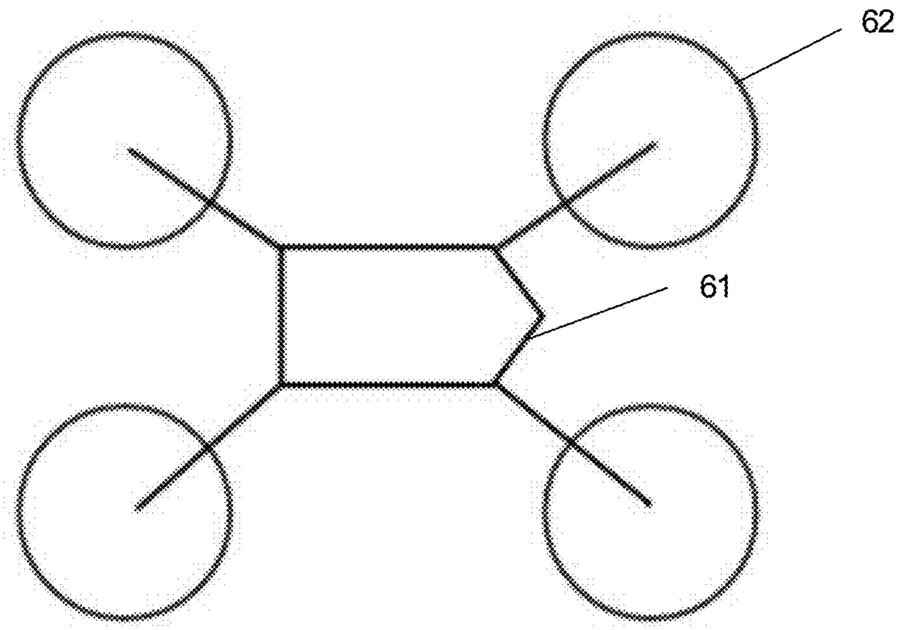
FIG. 6 is a schematic top view of an X-configuration quadrotor unmanned aerial vehicle consistent with the present disclosure.

FIG. 6 is a top view of an exemplary X-configuration quadrotor unmanned aerial vehicle provided by one embodiment of the present disclosure.

As shown in FIG. 6, four rotors 62 are arranged at the top corners of the body 61 away from each other. The rotors 62 are rotatably fixed directly on the body 61 or are rotatably fixed on the body 61 through arms. The rotation direction of each rotor 62 when it rotates in the forward direction may be different. When rotors in the rotating state among the four rotors 62 are in the forward rotation together, the resultant force provided makes the body 61 be subjected to a force away from the landing surface. The angles between the four arms in FIG. 6 are only shown as examples, and may be the same or different, which is not limited here.

Figure 7:
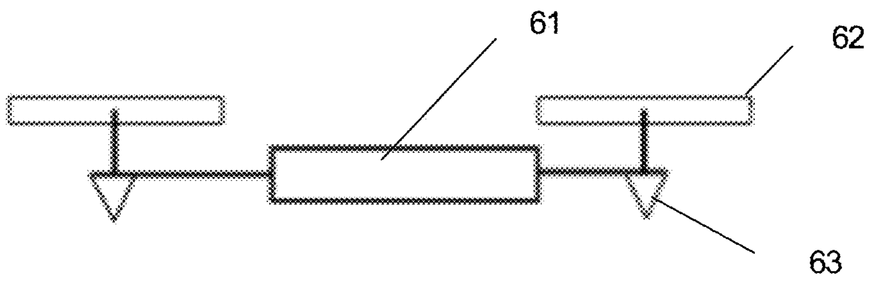
FIG. 7 is a schematic front view of an X-configuration quadrotor unmanned aerial vehicle consistent with the present disclosure.

FIG. 7 is a schematic front view of an X-configuration quadrotor unmanned aerial vehicle provided by one embodiment of the present disclosure.

As shown in FIG. 7, the X-configuration quadrotor unmanned aerial vehicle also includes a landing stand 63 in addition to the body 61 and the rotors 62. The landing stand 63 provides support for the body and other components after the unmanned aerial vehicle lands. The landing stand 63 may be arranged at the arms or the body 61.

In one embodiment, when the body is in the to-be-rescued attitude, the angle between the body along the first direction and the horizontal plane may be larger than a first preset angle threshold. For example, the first preset angle threshold may include, but is not limited to 30°-180°, such as 30°, 35°, 50°, 70°, 90°, 120°, 130°, 150°, 170°, 180°, and so on.

Figure 8:
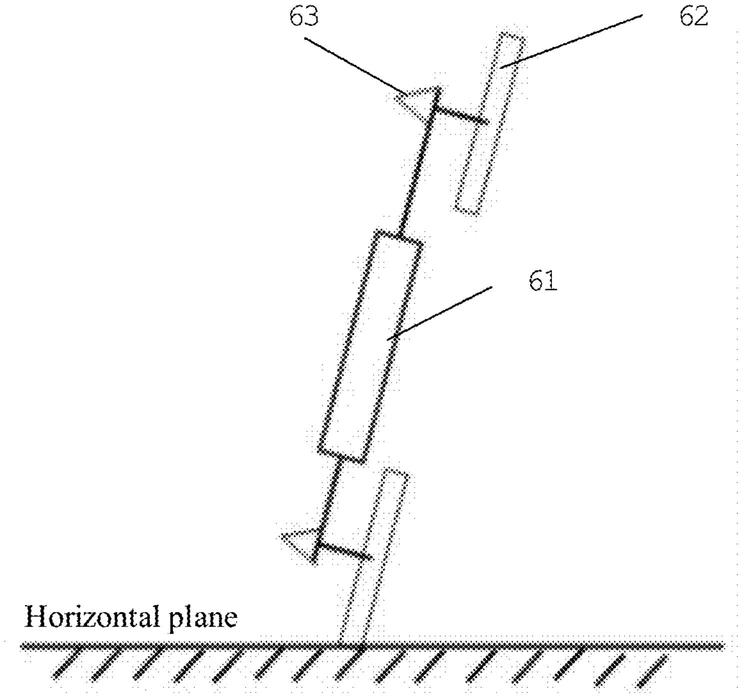
FIG. 8 is a schematic diagram of an X-configuration quadrotor unmanned aerial vehicle in a to-be-rescued attitude consistent with the present disclosure.

FIG. 8 is a schematic diagram of an X-configuration quadrotor unmanned aerial vehicle in the to-be-rescued attitude, provided by one embodiment of the present disclosure.

As shown in FIG. 8, at least one rotor 62 of the quadrotor unmanned aerial vehicle interferes with the horizontal plane, and the angle between a motor shaft connected to the at least one rotor and the horizontal plane is too large, such that the quadrotor unmanned aerial vehicle is unable to take off normally and is in the to-be-rescued attitude. When all the rotors 62 in FIG. 8 rotate, at least one or more of the rotors 62 may be damaged. Further, even if all the rotors 62 are able to rotate, since the rotors 62 rotating forwardly will provide a downward force to the body 61, the attitude of the body 61 is more different from the normal take-off attitude.

Figure 9:
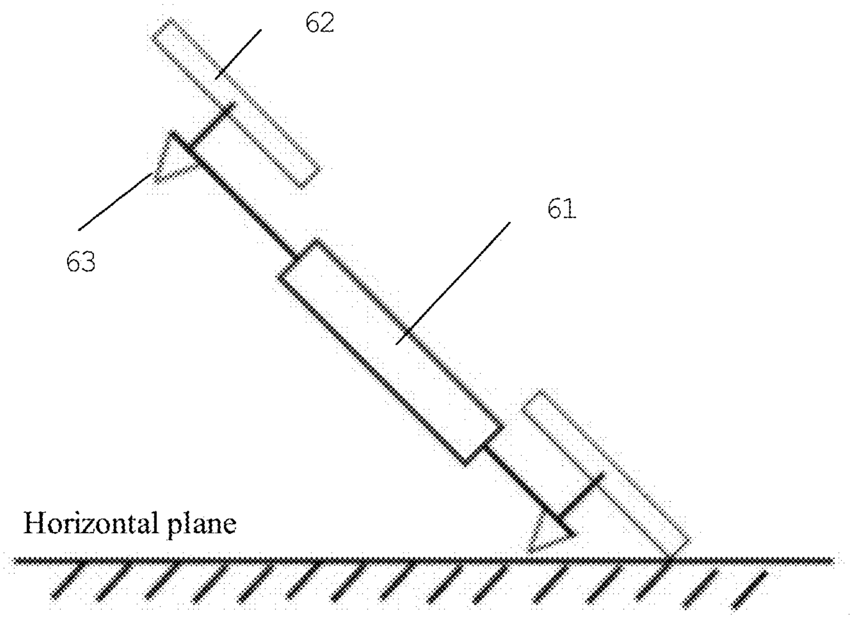
FIG. 9 is a schematic diagram of another X-configuration quadrotor unmanned aerial vehicle in a to-be-rescued attitude consistent with the present disclosure.

FIG. 9 is a schematic diagram of an X-configuration quadrotor unmanned aerial vehicle in the to-be-rescued attitude, provided by another embodiment of the present disclosure.

As shown in FIG. 9, at least one rotor 62 of the quadrotor unmanned aerial vehicle interferes with the horizontal plane, and the angle between a motor shaft connected to the at least one rotor and the horizontal plane is larger than the preset angle threshold (for example, larger than 20°, 25°, or 30°), such that the quadrotor unmanned aerial vehicle is unable to take off normally and is in the to-be-rescued attitude. When all the rotors 62 in FIG. 9 rotate, at least one or more of the rotors 62 may be damaged. Therefore, at least one or more of the rotors 62 may be controlled to rotate in reverse, to adjust the attitude of the body 61.

In one embodiment, in response to the second control instruction, at least two rotors may provide the second thrust when the angle is larger than the second preset angle threshold, such that the body takes off in the to-be-rescued attitude. The second control instruction may be an automatic rescue control instruction, such that the multi-rotor unmanned aerial vehicle enters the automatic rescue mode to perform rescue operations.

When all the rotors do not interfere with the landing surface during the flipping rescue process, to improve the success rate of the flipping rescue process, in the process of controlling the second one or more of the at least two rotors to provide the second thrust respectively, the first one or more of the at least two rotors may respond to the first control instruction to provide the first thrust respectively. In this way, a larger rotational force may be provided for the body 61, to adjust the attitude of the multi-rotor unmanned aerial vehicle to the normal take-off attitude.

Figure 10:
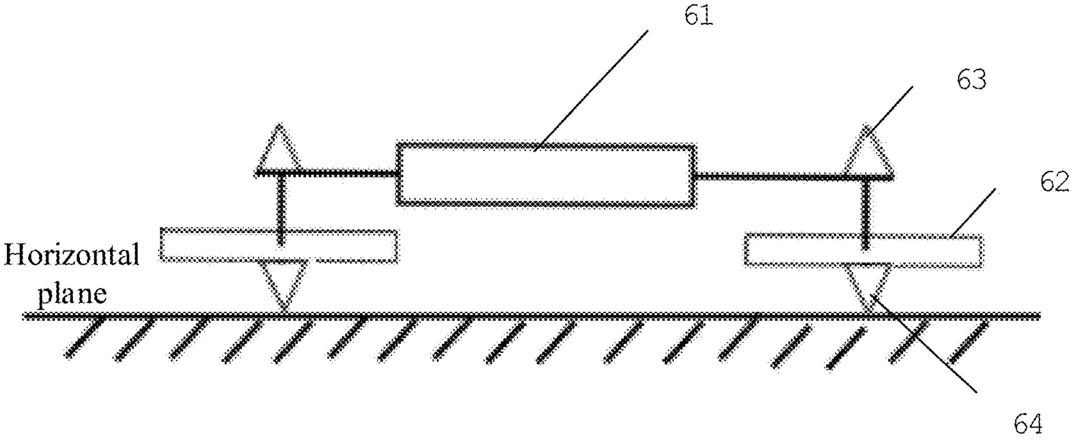
FIG. 10 is a schematic diagram of another X-configuration quadrotor unmanned aerial vehicle in a to-be-rescued attitude consistent with the present disclosure.

FIG. 10 is a schematic diagram of an X-configuration quadrotor unmanned aerial vehicle in the to-be-rescued attitude, provided by another embodiment of the present disclosure.

As shown in FIG. 10, the X-configuration quadrotor unmanned aerial vehicle flips about 180° relative to the normal take-off attitude. In this to-be-rescued attitude, at least one or more of the rotors 62 may be controlled to rotate in reverse to provide a force that keeps the body 61 away from the horizontal plane. To realize this function, at least one or more of the rotors 62 do not interfere with the horizontal plane. In FIG. 10, the rotors 62 and the horizontal plane are isolated by an isolation structure 64, which reduces the probability of interference between the rotors 62 and the horizontal plane. It should be noted that the isolation structure 64 in FIG. 10 is only shown as an example, and it may also be an isolation structure surrounding the side circumference of the rotors 62, which is not limited here.

In one embodiment, the unmanned aerial vehicle may further include an inertial measurement unit for measuring attitude information of the body. Correspondingly, the unmanned aerial vehicle may further include: a carrier disposed at the body, and the carrier may be used to carry a photographing device. Correspondingly, when executing a executable instruction, at least one processor of the unmanned aerial vehicle may be used to: determine whether the rescue operation is able to be performed on the unmanned aerial vehicle based on the attitude information and/or the image captured by the photographing device.

For example, for a specific type of unmanned aerial vehicles, when the angle between the body along the first direction and the horizontal plane is within a certain range, it may be determined that the rescue operation is able to be performed. The range may be: 30°-45°, 170°-180°, etc. For another specific model of unmanned aerial vehicles, the range may be: 30°-180°, etc.

In one embodiment, the unmanned aerial vehicle may include a two-way electronic speed controller, which is used to control the forward rotation or reverse rotation of the motor rotators connected to at least two rotors respectively to drive the respective forward rotation or reverse rotation of the at least two rotors. When the unmanned aerial vehicle is able to perform the rescue operation, the propellers of at least one or more of the at least two rotors may be able to rotate forward or reverse and may not interfere in the current attitude, and the two-way electronic speed governor may be able to work normally.

For example, when the photographing device is provided at the gimbal, whether the unmanned aerial vehicle is able to perform the rescue operation may be determined based on the images captured by the photographing device. For example, the angle between the rotors relative to the landing surface or whether there will be interference with the landing surface when the rotors rotate may be calculated based on the image. The user may determine whether the rescue operation is able to be performed on the unmanned aerial vehicle based on the image captured by the photographing device, or the processor may perform image processing on the captured image to determine whether the unmanned aerial vehicle is able to perform the rescue operation.

In one embodiment, when the at least one processor executes the executable instruction, it may be further configured to: determine rescuable rotors that are able to provide the second thrust based on the attitude information and/or the image captured by the photographing device, to control the rescuable rotors to perform the rescue operation. Each rotor may have a unique rotor identification, so as to determine the rotors that are able to rotate.

For example, controlling the propellers to rotate in reverse to perform flip rescue of the unmanned aerial vehicle may be divided into two categories. One type is manual flip rescue, and the other is automatic flip rescue. In the manual flip rescue, according to the direction of the manual stick operation and the control amount, motor reverse instruction corresponding to the direction and magnitude may be output to realize the flip of the unmanned aerial vehicle. In the automatic flip rescue, the multi-rotor unmanned aerial vehicle may automatically select corresponding motors according to the current attitude rollover situation to perform the flip rescue operation. The control mode of the automatic flip rescue may be divided into open-loop instruction control and closed-loop instruction control. When the unmanned aerial vehicle detects a power failure during the propeller reversal process, it may also actively remind the user and give the user manual rescue operations as a guide, or it may automatically adjust the propeller rotation strategy according to the power failure situation in the automatic rescue mode.

Figure 11:
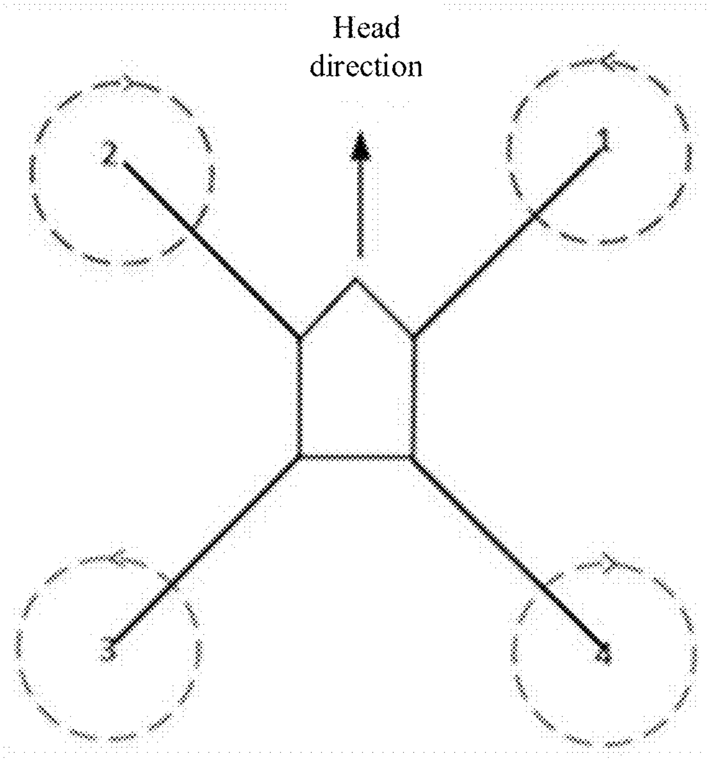
FIG. 11 is a schematic diagram of an X-configuration quadrotor unmanned aerial vehicle and numbers of its rotors consistent with the present disclosure.

FIG. 11 is a schematic diagram of an X-configuration quadrotor unmanned aerial vehicle and the rotor identifications, provided by another embodiment of the present disclosure.

As shown in FIG. 11, the rotor located at the right front of the body is No. 1 rotor, the rotor located at the left front of the body is No. 2 rotor, the rotor located at the left rear of the body is No. 3 rotor, and the rotor located at the right rear of the body is No. 4 rotor.

In one embodiment, each of the at least two rotors may be connected to a corresponding motor shaft. Correspondingly, when the executable instruction is executed, at least one processor may be used to: when the body is in the to-be-rescued attitude and the unmanned aerial vehicle is able to perform the rescue operation, send a control instruction to the motors of at least one or more of the at least two rotors, to control the motors to drive the rotors corresponding to the motors to provide the second thrust. Specifically, the four motors of the X-configuration rotors may be numbered counterclockwise from the right front motor of the nose as No. 1, No. 2, No. 3, and No. 4 motors. During normal flight, No. 1, No. 2, No. 3, and No. 4 motors may rotate counterclockwise, clockwise, counterclockwise, and clockwise, respectively. The direction of rotation may be the forward direction for each propeller, and the upward thrust may be provided when the unmanned aerial vehicle is in the normal attitude. When attitude angle of the unmanned aerial vehicle exceeds 90°, the thrust generated by the forward rotation of each propeller may make the aircraft go down.

Specifically, when the attitude information indicates that the body is in the to-be-rescued attitude and the sensor data indicates that the unmanned aerial vehicle is able to perform rescue operation, a control instruction may be sent to the motors of at least one or more of the at least two rotors to control the motors to drive the rotors corresponding to the motor to provide the second thrust.

In one embodiment, when the unmanned aerial vehicle is in the normal take-off attitude, the projection of the direction of the resultant force of the thrust provided by the at least two rotors when they are rotating in the forward direction on the vertical line passing through the center of gravity of the unmanned aerial vehicle may be opposite to a direction pointing to the center of gravity of the earth, and/or, the respective propellers of the at least two rotors may be separated from the landing surface in the current attitude.

When the unmanned aerial vehicle is in the normal take-off attitude, it may be able to perform take-off tasks and so on.

In one embodiment, each of the at least two rotors may have a rotor identification.

The unmanned aerial vehicle may further include: a memory for storing the rescue strategy, such that the unmanned aerial vehicle is able to perform the rescue operation based on the rescue strategy in the automatic rescue mode or the automatic rescue return mode. The rescue strategy may include at least one of the following.

For example, the rescue strategy may include a first mapping relationship between the angles and the rotor identification. For example, in the manual rescue mode, the stick operation input by the user on the control terminal may include the stick angles. Based on the first mapping relationship, the rotor identification of the rotors that need to rotate may be determined, to control the corresponding rotors to provide thrust in the second direction. For example, in the automatic rescue mode, after the corresponding rotors are determined based on the stick angle input by the user's stick operation, the speed and rotation time of the rotors may be automatically controlled to realize the rescue operation.

For example, the rescue strategy may include a second mapping relationship among angles, rotor identifications, and stick amount moduli. For example, in the manual rescue mode, the stick operation input by the user on the control terminal may include the stick angles and the control amount modulus. Based on the second mapping relationship, the rotor identification of the rotors that need to rotate may be determined, to control the corresponding rotors to provide thrust corresponding to the control amount modulus in the second direction.

For example, the rescue strategy includes a third mapping relationship among angles, rotor identification, attribute information, and control amount modulus. The attribute information may include at least one of voltage information of the power supply, weight information of the unmanned aerial vehicle, air pressure information of the environment, or trigger time of the rescue control instruction.

The voltage information may be used to measure the remaining power. Since the energy efficiency of the motors in reverse rotation is lower than that in forward rotation, it may be necessary to provide larger energy to drive the motors to output higher power. When the power is sufficient, the rescue strategy with higher energy consumption may be adopted, such as a higher speed. When the power is not sufficient, the rescue strategy with lower energy consumption may be adopted to avoid the inability to determine the landing position of the unmanned aerial vehicle because of the power being exhausted.

The weight information of the unmanned aerial vehicle may be used to measure the amount of force that the rotors need to provide. For example, for a rotor unmanned aerial vehicle with a larger body weight, the unmanned aerial vehicle may need a higher rotational speed to provide larger force against the gravity of the rotor unmanned aerial vehicle. For example, for the unmanned aerial vehicle carrying heavier operating equipment, the unmanned aerial vehicle may need a higher rotational speed to provide greater force against the gravity of the operating equipment. Specifically, the control amount modulus or the current value corresponding to the control amount modulus (the current input to the motor) may be compensated based on the weight information of the unmanned aerial vehicle. For example, when the weight of the unmanned aerial vehicle is larger, the degree of compensation may be larger, to deal with unmanned aerial vehicles with different weights and improve the scope of application of the rescue strategy.

The ambient air pressure information may be used to measure the amount of force the rotors need to provide. For example, for the unmanned aerial vehicle at a higher altitude, the atmosphere in the environment is thinner, and more power may need to be provided to generate a sufficiently high reaction force. For example, when the altitude of the unmanned aerial vehicle is higher, the unmanned aerial vehicle may need a higher rotational speed to provide a high enough force to resist the gravity of the unmanned aerial vehicle and operating equipment. Specifically, the control amount modulus or the current value corresponding to the control amount modulus (the current input to the motor) may be compensated based on the ambient air pressure information of the unmanned aerial vehicle. For example, when the altitude of the unmanned aerial vehicle is higher, the degree of compensation may be larger, to deal with unmanned aerial vehicles in different positions and improve the scope of application of the rescue strategy.

In one embodiment, the rescue mode of the unmanned aerial vehicle may include a manual rescue mode and an automatic rescue mode.

In the manual rescue mode, the rescue control instruction may include the control amount modulus, instruction direction and motor rotation instruction input by the joystick of the control terminal. Specifically, for the manual rescue mode, at least one or more of the at least two rotors may be able to provide the second thrust in response to the control amount modulus, the instruction direction and the motor rotation instruction. The manual rescue strategy may output motor reversal instruction with the corresponding direction and magnitude based on the direction and magnitude of the user's horizontal stick operation (pitch or roll) instruction.

For example, the input of the manual rescue mode may include: the control amount modulus, the instruction direction and the motor rotation instruction. Correspondingly, the output of the manual rescue mode may include: the rotor identification or control amount modulus corresponding to the motors with reverse rotation.

Figure 12:
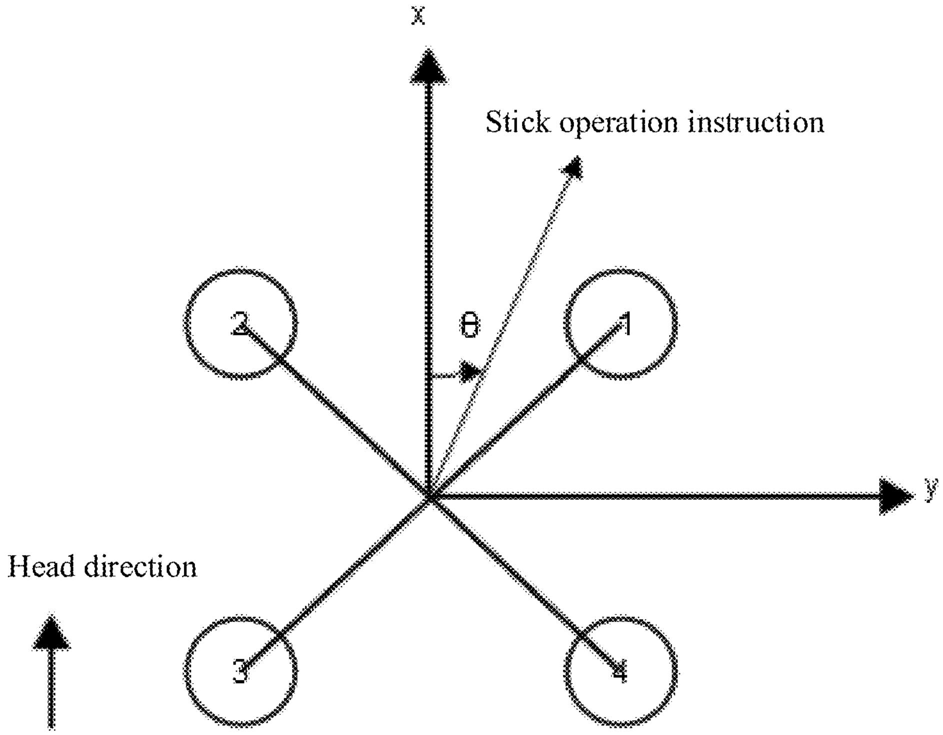
FIG. 12 is a schematic diagram of stick operation instruction mapping of the X-configuration quadrotor unmanned aerial vehicle and its motors in FIG. 11.

FIG. 12 is a schematic diagram showing the mapping between the X-configuration quadrotor unmanned aerial vehicle and the stick operation instruction for the motors.

As shown in FIG. 12, the body coordinate system is x-y-z. The x-axis direction is the direction of the head, the y-axis direction is perpendicular to the x-axis pointing to the right side of the body, and the z-axis direction is vertical to x and y downwards. The horizontal stick operation instruction is directly mapped to the body coordinate system, where the direction of the pitch stick operation instruction is the x direction, and the roll stick operation instruction direction is the y direction.

The output motor control instruction is a function of the input stick operation instruction:

$$\begin{pmatrix} num \\ pwm \end{pmatrix} = f(\theta, A), \tag{1}$$

where num is the serial number of the motor of the output instruction with a value range of {1,2,3,4}, pwm is the instruction output magnitude with a value range of [0,100%], θ is the angle between the horizontal stick operation instruction and the x-axis (the head) in the body coordinate system with a range of [−180°~+180° ], and A is the modulus of the input stick operation instruction with a range of [0, 1].

An exemplary mapping relationship is shown in Eq. (2) and (3).

$$um = f(\theta, A) = \begin{cases} 1,2, & -22.5° < \theta \le 22.5°, A > 0 \\ 1, & 22.5° < \theta \le 67.5°, A > 0 \\ 1,4, & 67.5° < \theta \le 112.5°, A > 0 \\ 4, & 112.5° < \theta \le 157.5°, A > 0 \\ 3,4, & |\theta| > 157.5°, A > 0 \\ 3, & -157.5° < \theta \le -112.5°, A > 0 \\ 2,3, & -112.5° < \theta \le -67.5°, A > 0 \\ 2, & -67.5° < \theta \le -22.5°, A > 0 \end{cases}, \tag{2}$$

$$pwm = f(\theta, A) = \begin{cases} 0, & A < 0.1 \\ A, & 0.1 < A \le 0.8 \\ 0.8, & 0.8 < A \le 1 \end{cases}. \tag{3}$$

In one embodiment, to improve the safety of the manual rescue mode, at least one processor of the unmanned aerial vehicle may be configured to: convert the control amount modulus into a safe stick modulus when executing the executable instruction. Correspondingly, in the manual rescue mode, the rescue control instruction may include the safe control amount modulus, the instruction direction and the motor rotation instruction. For example, when the maximum control amount modulus is A, the safe control amount modulus may be defined to be less than or equal to 0.8 A.

In Eq. (2) and Eq. (3), 0 determines which motor is reversed, and A determines the magnitude of the instruction. This rescue strategy supports the user to control the rotation of one or two motors through the direction of the horizontal stick, or it may be simplified to only control the rotation of two motors.

This strategy takes into account the dead zone of the stick, and the motors may not rotate when the input control amount modulus is less than a certain threshold (which is adjustable) to prevent false triggering. During the rotation process, when abnormal power is detected, the app or virtual reality device (VR device), such as virtual reality glasses (VR glasses, simply referred to as glasses), may prompt the user to guide the user to operate the motors without abnormality. It should be noted that the above rescue strategy is not the only one, and the thresholds and parameters involved in the strategy may be adjusted according to the actual rescue effect of the unmanned aerial vehicle.

In one embodiment, to reduce the risk of losses caused by user mis-operation in the manual rescue mode, the method may also include that: in the manual rescue mode, the unmanned aerial vehicle also sends guidance prompt information to the communication interface of the control terminal through its own communication interface, such that the display screen of the control terminal displays prompt information to guide the user to save the vehicle. For example, the guidance prompt information includes but is not limited to at least one of: the direction of the stick operation, the modulus of the stick operation, and the like. The display mode of the guidance prompt information includes but is not limited to at least one of text prompts, picture prompts, or animation demonstration effect prompts.

In one embodiment, the guidance prompt information sent by the communication interface of the unmanned aerial vehicle includes at least one of: a schematic image of the stick, and a value of the parameter of the stick. The schematic image of the stick may be generated based on the value of the parameter of the stick, and the value of the parameter of the stick may be least determined based on the attitude information of the body.

The method of determining the direction of the stick operation and the modulus of the stick operation may refer to the following content related to the automatic rescue mode.

In the automatic flip rescue mode, the user does not need to judge which motor is reversed and then manually give the corresponding control instruction. The user may only need to trigger the flip rescue mode through a remote control button, and the unmanned aerial vehicle may be able to automatically select the corresponding motors to perform the reverse rescue operation according to the current rollover situation. The control mode of the automatic flip rescue may include open-loop instruction control and closed-loop instruction control.

In one embodiment, at least one or more of the at least two rotors may be able to respond to the initial attitude information and the motor rotation instruction, and perform open-loop control to provide the second thrust.

The open-loop instruction control may mean include that the unmanned aerial vehicle calculates and outputs an open-loop control instruction according to the initial attitude tilt situation, and the control instruction may not be adjusted in real time according to the current state during the instruction control process. In the automatic rescue mode, the rescue control instruction may include a motor rotation instruction.

In one embodiment, the input of the open-loop control may include: initial attitude information, take-off attitude threshold, motor rotation instruction or attribute information. The attribute information may include at least one of voltage information of the power supply, weight information of the unmanned aerial vehicle, atmospheric pressure information of the environment, or the number of times the rescue control instruction is triggered. Correspondingly, the output of the open-loop control may include: rotor identification, control amount modulus and instruction output duration.

Figure 13:
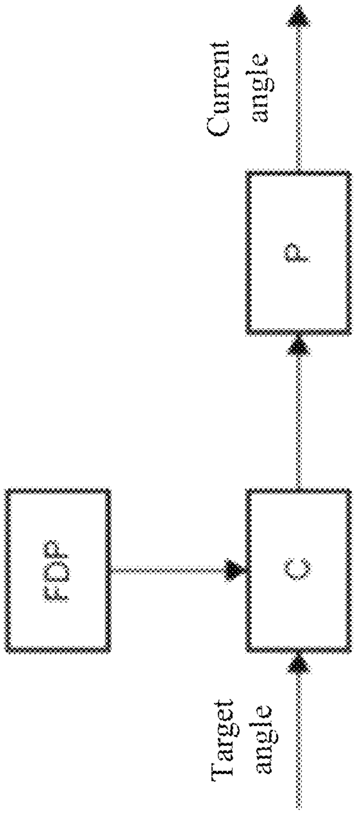
FIG. 13 is a schematic diagram of an open-loop control process consistent with the present disclosure.

FIG. 13 is a schematic diagram of the open-loop control process provided by one embodiment of the present disclosure.

As shown in FIG. 13, the target angle (target_ang) is the target attitude control instruction, and the current angle (current_ang) is the current attitude angle of the unmanned aerial vehicle. C is an open-loop controller module, which calculates and outputs control instructions according to the open-loop control strategy. P is the control object module, which represents the aircraft here. The fault diagnosis and protection module (FDP) is responsible for monitoring the power failure and other problems in the control process, and selects the corresponding protection strategy according to the fault situation.

Figure 14:
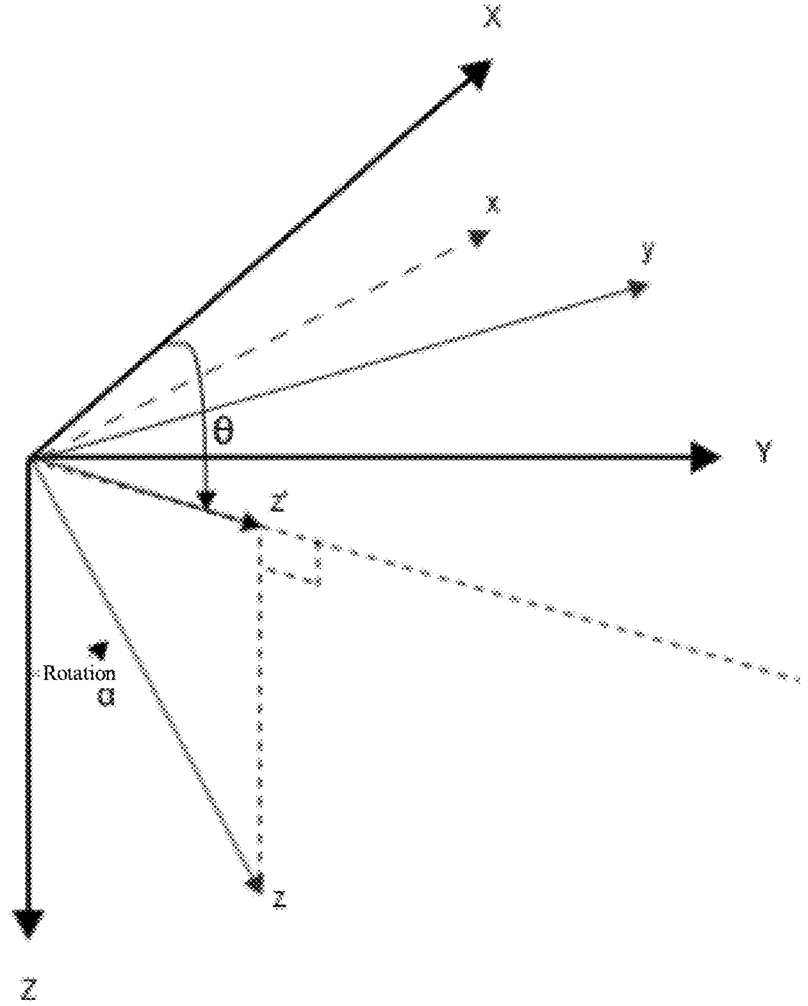
FIG. 14 is a schematic diagram of a reference coordinate system of flip rescue consistent with the present disclosure.

FIG. 14 is a schematic diagram showing a reference coordinate system for flip rescue provided by one embodiment of the present disclosure.

As shown in FIG. 14, the body coordinate system x-y-z is fixed to the body as defined above, and the reference coordinate system X-Y-Z is defined. The reference coordinate system X-Y-Z is formed by the rotation of the body coordinate system x-y-z around the rotation axis on the horizontal plane. The Z axis is vertically downward, and the X-Y plane is on the horizontal plane. By definition, the current attitude of the unmanned aerial vehicle is obtained by rotating the initial X-Y-Z position by an angle of α. The angle between the projection z' of the rotated body z-axis on the X-Y horizontal plane and the X-axis is θ.

The actual control output instruction is a function of variables such as θ, tilt angle α, and battery voltage, as shown in Eq. (4):

$$\begin{pmatrix} num \\ pwm \\ t \end{pmatrix} = f(\theta, \alpha, vol) \quad (4)$$

where num is the serial number of the motor of the output instruction with a value range of {1,2,3,4}, pwm is the instruction output magnitude with a value range of [0,100%], t is the instruction output duration. α is the magnitude of the tilt angle with a range of [0°,180° ], and vol is the current voltage ratio of the battery (current voltage/full voltage) with a range of [0,1].

An exemplary automatic rescue strategy is shown in Eq. (5) to Eq. (8).

$$num = f(\theta, \alpha, vol) = \begin{cases} 1,2, & -45° < \theta \le 45°, \alpha > 35° \\ 1,4, & 45° < \theta \le 135°, \alpha > 35° \\ 3,4, & |\theta| > 135°, \alpha > 35° \\ 2,3, & -135° < \theta \le -45°, \alpha > 35° \end{cases} \quad (5)$$

$$pwm = f(\theta, \alpha, vol) = \begin{cases} 0, & \alpha \le 35° \\ \left[0.55 + (\alpha - 35°) * \frac{0.65 - 0.55}{90° - 35°}\right] * \text{dyn\_gain}, & 35° < \alpha \le 90° \\ \left[0.65 + (\alpha - 90°) * \frac{0.8 - 0.65}{180° - 90°}\right] * \text{dyn\_gain}, & 90° < \alpha \le 180° \end{cases} \quad (6)$$

$$\text{dyn\_gain} = \begin{cases} 0.8, & vol \le 0.5, \\ 0.8 + (vol - 0.5) * \frac{1 - 0.8}{1 - 0.5}, & 0.5 < vol \le 1 \end{cases} \quad (7)$$

$$t = f(\theta, \alpha, vol) = \begin{cases} 0, & \alpha \le 35° \\ \left[0.5 + (\alpha - 35°) * \frac{0.55 - 0.5}{90° - 35°}\right], & 35° < \alpha \le 90° \\ \left[0.55 + (\alpha - 90°) * \frac{0.75 - 0.55}{180° - 90°}\right], & 90° < \alpha \le 180° \end{cases} \quad (8)$$

It can be seen from the above that when the motor tilt angle α is less than a certain threshold (for example, 35°), it may be considered to be able to take off normally, and only when it is larger than the certain threshold the reverse operation may be able to be performed.

The reversed motor serial number num may be determined by the current attitude tilt of the aircraft. This strategy makes a mapping based on the θ angle, and other strategies may also be used according to the tilt situation.

The magnitude pwm of the reverse instruction and the duration t of the output are both segmented and linearly mapped according to the tilt angle α. The mapping relationship may also be adjusted according to different models, and different thresholds and even mapping relationships can be selected.

The battery voltage may also have a certain impact on the output instruction. This strategy makes piecewise linear compensation for the output instruction according to the current voltage ratio. In practical applications, other compensation strategies may also be adopted.

Further, the number of times the rescue is triggered may also affect the output instruction. For example, after the first trigger of the rescue process, the aircraft may do not turn over and may be still in an abnormal take-off attitude. The size and duration of subsequent trigger output instruction may increase accordingly.

The above is the strategy when the power of the aircraft is normal. Especially when the power of a certain motor is abnormal, the FDP module may monitor the power abnormality, and automatically adjust the serial number num of the reverse motors according to the abnormal power situation, and use the motors with normal power to perform automatic rescue operations.

In one embodiment, at least one or more of the at least two rotors may be able to respond to the initial attitude information and the motor rotation instruction, and perform open-loop control to provide the second thrust. The closed-loop instruction control may include that the unmanned aerial vehicle calculates the control instruction according to the current attitude to make the attitude roll and the control instruction is adjusted in real time according to the current attitude during the rolling process.

In one embodiment, the input of the closed-loop control may include: current attitude information, take-off attitude threshold, or motor rotation instruction or attribute information. The attribute information may include at least one of voltage information of the power supply, weight information of the unmanned aerial vehicle, atmospheric pressure information of the environment, or the number of times the rescue control instruction is triggered. Correspondingly, the output of the closed-loop control may include: rotor identification or control amount modulus FIG. 15 is a schematic diagram of the closed-loop control process provided by one embodiment of the present disclosure.

Figure 15:
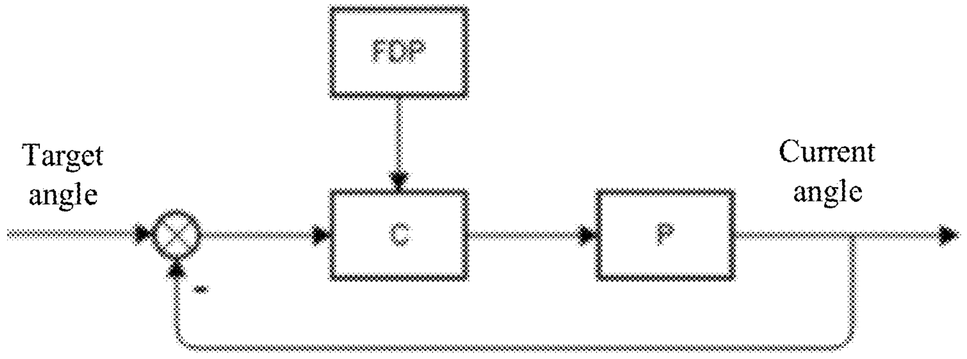
FIG. 15 is a schematic diagram of a closed-loop control process consistent with the present disclosure.

As shown in FIG. 15, the target angle (target_ang) is the target attitude control instruction, and the current angle (current_ang) is the current attitude angle of the unmanned aerial vehicle. C is an open-loop controller module, which calculates and outputs control instructions according to the open-loop control strategy. P is the control object module, which represents the aircraft here. The fault diagnosis and protection module (FDP) is responsible for monitoring the power failure and other problems in the control process, and selects the corresponding protection strategy according to the fault situation.

Compared with open-loop instruction control, closed-loop control may be able to adjust the instruction magnitude in real time according to the current attitude of the unmanned aerial vehicle, and the whole process may be smoother and more controllable.

In one embodiment, the thrust output by at least one or more of the at least two rotors may be able to be replaced by the thrust output by one of the at least two rotors except the at least one or more of the at least two rotors or the resultant force output by multiple rotors. For example, for an X-configuration quadrotor unmanned aerial vehicle, the thrust output by one rotor may be able to be replaced by the resultant force output by two adjacent rotors. In this way, when it is determined that there is interference between one rotor and the landing surface, the resultant force output by two rotors adjacent to the rotor may be used to replace the force output by the rotor.

In one embodiment, when executing the executable instruction, at least one processor of the unmanned aerial vehicle may be configured to: monitor power failures of the motors corresponding to the at least two rotors, and replace motors with power failures. For example, a manner of replacing a motor with power failure may include: using two motors adjacent to the motor with power failure for replacement.

In one embodiment, the communication interface of the unmanned aerial vehicle may be also used to receive a rescue mode setting instruction from the communication interface of the control terminal. The rescue mode setting instruction may include at least one of: a rescue strategy setting instruction, and/or a takeoff attitude threshold setting instruction. The rescue strategy may be modified through the rescue strategy setting instruction. The takeoff attitude threshold, such as angle, may be set through the takeoff attitude threshold setting instruction.

The entry and exit conditions of the rescue function are described as examples below.

The flip rescue mode is used as an example for illustration. The entry condition of the flip rescue function may include that the current attitude of the unmanned aerial vehicle is determined to not meet the normal takeoff requirements. The attitude information of the unmanned aerial vehicle may be obtained by combination of sensor IMU or vision module. There are two main conditions for whether the unmanned aerial vehicle meets the normal take-off requirements. For example, one condition is whether the total thrust generated by the forward rotation of the propellers in the current attitude is upward, and the other is whether the rotation of the propellers causes the risk of scratching the ground when it is placed on a horizontal plane in the current attitude. When the total thrust generated by the forward rotation of the propellers in the current attitude is downward, or when the propellers that are placed on a horizontal plane in the current attitude have a risk of scratching the ground due to the rotation of the propellers, it may be considered that the current attitude does not meet the normal takeoff requirements, and the flip rescue function may be triggered. The attitude threshold used for judgment needs to be determined according to different unmanned aerial vehicles.

The condition for automatically exiting the flip rescue function may include that the current attitude of the unmanned aerial vehicle meets the normal take-off requirements. That is, when the total thrust generated by the forward rotation of the propellers in the current attitude is upward and the propellers that are placed on a horizontal plane in the current attitude have no risk of scratching the ground, the flip rescue function may be automatically exited. The attitude threshold used for judgment may be also determined according to different unmanned aerial vehicles. Of course, users may also manually exit this function at any time.

It should be noted that for multi-rotor unmanned aerial vehicle s with configurations other than the X configuration, the above-mentioned principles and methods may still be used to perform flip rescue operations.

In the unmanned aerial vehicle provided by the present disclosure, after the abnormal drop because of propeller scratches, collisions or other problems during the flight, its ground attitude may often have a large roll and it may be unable to take off normally. At this time, the unmanned aerial vehicle may be often far away from the operator, or may fall on a roof, another side of the river, or other places that are not easily accessible by humans. It may be very difficult to rescue the aircraft and even eventually cause the unmanned aerial vehicle to be lost. This problem is common for remote-controlled rotor unmanned aerial vehicles. The unmanned aerial vehicle provided by the embodiments of the present disclosure may be controlled remotely such that the attitude of the unmanned aerial vehicle changes from the to-be-rescued attitude to the take-off attitude, such that the unmanned aerial vehicle is able to take off in the take-off attitude. The difficulty of rescuing the aircraft and the loss of users may be reduced, and the user's flying experience may be improved.

The present disclosure also provides a control terminal.

The control terminal may include a processor for generating an emergency control instruction, and a communication interface configured to send the rescue control instruction to an unmanned aerial vehicle. The rescue control instruction may be used to instruct the unmanned aerial vehicle to perform the rescue operation when the body of the unmanned aerial vehicle is in the to-be-rescued attitude and the unmanned aerial vehicle is able to perform the rescue operation.

The control terminal may include, but is not limited to: a remote control, a smart terminal installed with specified applications, a virtual reality device, etc.

The unmanned aerial vehicle may include a body and at least two rotors rotatably arranged at the body. Each of the at least two rotors may provide a first thrust along a first direction when rotating in the forward direction, and each of the at least two rotors may provide a second thrust along a second direction when rotating in the reverse direction. The first direction may be opposite to the second direction. The unmanned aerial vehicle may have a rescue mode. to perform rescue operations.

Figure 16:
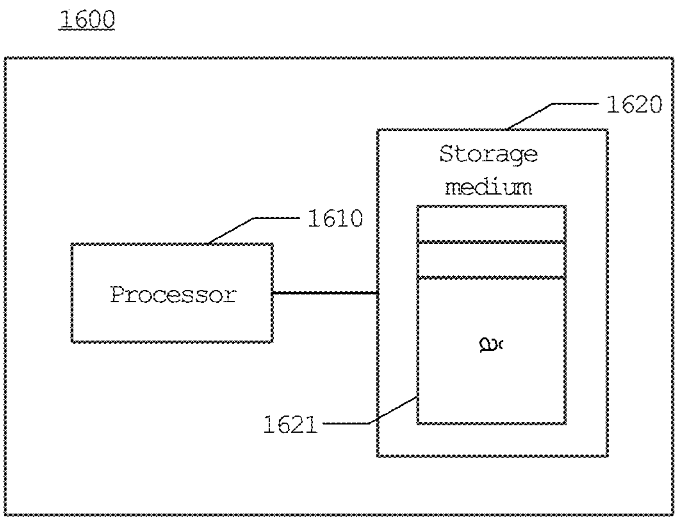
FIG. 16 is a schematic diagram of a control terminal consistent with the present disclosure.

FIG. 16 is a structure of a control terminal provided by one embodiment of the present disclosure.

As shown in FIG. 16, the control terminal 1600 includes one or more processors 1610 which may be integrated into one processing unit or may be respectively arranged in multiple processing units, and a computer-readable storage medium 1620 used to store one or more computer programs 1621. When the one or more computer programs are executed by the one or more processors, the rescue control instruction may be obtained through an input device and may be sent to the unmanned aerial vehicle through a communication interface.

For example, one or more processors, such as programmable processors (e.g., central processing units), may be packaged in one or more processing units. For example, the one or more processing units may include a field-programmable gate array (FPGA) or one or more ARM processors. The one or more processing units may be connected with the non-volatile computer-readable storage medium 1620. The non-transitory computer readable storage medium 1620 may store logic, code, and/or computer instructions which could be executed by the one or more processing units for performing one or more steps.

The one or more processing units may also be connected with a communication circuit to transmit and/or receive data with one or more peripheral devices (such as terminals, display devices, or other remote control devices).

Further, the control terminal may also include an input device for acquiring user operations. For example, the control terminal may include a processing unit, a memory, a display, and a communication circuit. And the user may send control instructions to the unmanned aerial vehicle or receive information collected by the unmanned aerial vehicle or the payload through the control terminal.

The input device may include one or more input mechanisms for receiving user input through manipulation of the input device. The one or more input mechanisms may include one or more of joysticks, switches, knobs, slide switches, buttons, dials, touch screens, keypads, keyboards, mice, voice controls, gesture controls, inertial modules, and the like. The input device may be used to receive user input for controlling any aspect of the unmanned aerial vehicle, a carrier, a load, or a component therein. The aspect may include attitude, position, orientation, flight, tracking, etc. For example, the input mechanism may be that the user manually sets one or more positions, and each position corresponds to a preset input to control the unmanned aerial vehicle.

In some embodiments, the input mechanism may be operated by a user to input control instructions to control the motion of the unmanned aerial vehicle. For example, the user may use a knob, switch or similar input mechanism to input the movement mode of the unmanned aerial vehicle such as automatic flight, automatic driving or movement according to a preset movement path. As another example, the user may control the position, attitude, direction, or other aspects of the unmanned aerial vehicle by tilting the control terminal in a certain way. The tilt of the control terminal may be detected by one or more inertial sensors, and corresponding motion instructions may be generated. As another example, the user may utilize the above-described input mechanism to adjust operational parameters of the load (such as zoom), the attitude of the load (via the carrier), or other aspects of any object on the unmanned aerial vehicle.

In some embodiments, the input mechanism may be operable by the user to input the aforementioned object information. For example, the user may select an appropriate tracking mode, such as a manual tracking mode or an automatic tracking mode, using a knob, switch, or similar input mechanism. The user may also utilize the input mechanism to select a specific target to track, target type information to implement, or other similar information. In various embodiments, the input mechanism may be performed by more than one device. For example, the input mechanism may be implemented by a standard remote control with a joystick. The standard remote controller with a joystick may be connected to a mobile device (such as a smartphone) running a suitable application program ("app") to generate control instructions for the unmanned aerial vehicle. The app may be used to get user input.

One processing unit may include one or more processors, such as programmable processors (such as central processing units or microcontrollers). The processing unit may be connected with a memory. The memory may include volatile or non-volatile storage media for storing data, and/or logic, code, and/or program instructions executable by the processing unit for executing one or more rules or functions. The memory may include one or more storage units (removable media or external memory such as SD card or RAM). In some embodiments, the data input to the device may be directly transferred and stored in the storage unit of the memory. The storage unit of the memory may store logic, code and/or computer instructions executed by the processing unit to perform various embodiments of the various methods described herein. For example, the processing unit may be used to execute instructions to cause one or more processors of the processing unit to process and display sensing data (such as images) received from the unmanned aerial vehicle, control instructions generated based on user input, including motion instructions and target information, and cause the communication circuit to transmit and/or receive data, etc. The storage unit may store sensing data or other data received from external devices such as unmanned aerial vehicles. In some embodiments, the storage unit of the memory may store the processing results generated by the processing unit.

In some embodiments, the display may be used to display information about the position, translational velocity, translational acceleration, direction, angular velocity, angular acceleration, or a combination thereof of the unmanned aerial vehicle 10, the carrier 13, and/or the load 14 shown in FIG. 1. The display may be used to receive information sent by the unmanned aerial vehicle and/or the load, such as sensing data (images recorded by cameras or other image capture devices), tracking data, control feedback data, etc. In some embodiments, the display may be implemented by the same device as the input device. In other embodiments, the display and the input device may be implemented by different devices.

The communication circuit may be used to transmit and/or receive data from one or more remote devices (such as, unmanned aerial vehicles, carriers, base stations, etc.). For example, the communication circuit may transmit control signals (such as motion signals, target information, or tracking control instructions) to peripheral systems or devices, such as the unmanned aerial vehicle 10, the carrier 13 and/or the load 14 in FIG. 1. The communication circuit may include a transmitter and a receiver for receiving data from the remote devices and transmitting data to the remote devices, respectively. In some embodiments, the communication circuit may include a transceiver, which combines the functions of a transmitter and a receiver. In some embodiments, the transmitter and receiver may communicate with each other and with the processing unit. Communication may utilize any suitable means of communication, such as wired communication or wireless communication.

The images captured by the unmanned aerial vehicle during its movement may be transmitted back from the unmanned aerial vehicle or the photographing device to the control terminal or other suitable equipment for display, playback, storage, editing or other purposes. Such transmission may occur in real-time or near real-time as the photographing device captures the imagery. Optionally, there may be a delay between image capture and transmission. In some embodiments, the imagery may be stored in the memory of the unmanned aerial vehicle without being transmitted anywhere else. Users may view these images in real time and, if desired, adjust object information or adjust other aspects of the unmanned aerial vehicle or its components. Adjusted target information may be provided to the unmanned aerial vehicle, and the iterative process may continue until a desired image is obtained. In some embodiments, imagery may be transmitted from the unmanned aerial vehicle, the photographing device, and/or the control terminal to a remote server. For example, images may be shared on some social networking platforms, such as WeChat, Moments or Weibo.

In one embodiment, the control terminal may include at least one of a remote controller or a wearable device.

Figure 17:
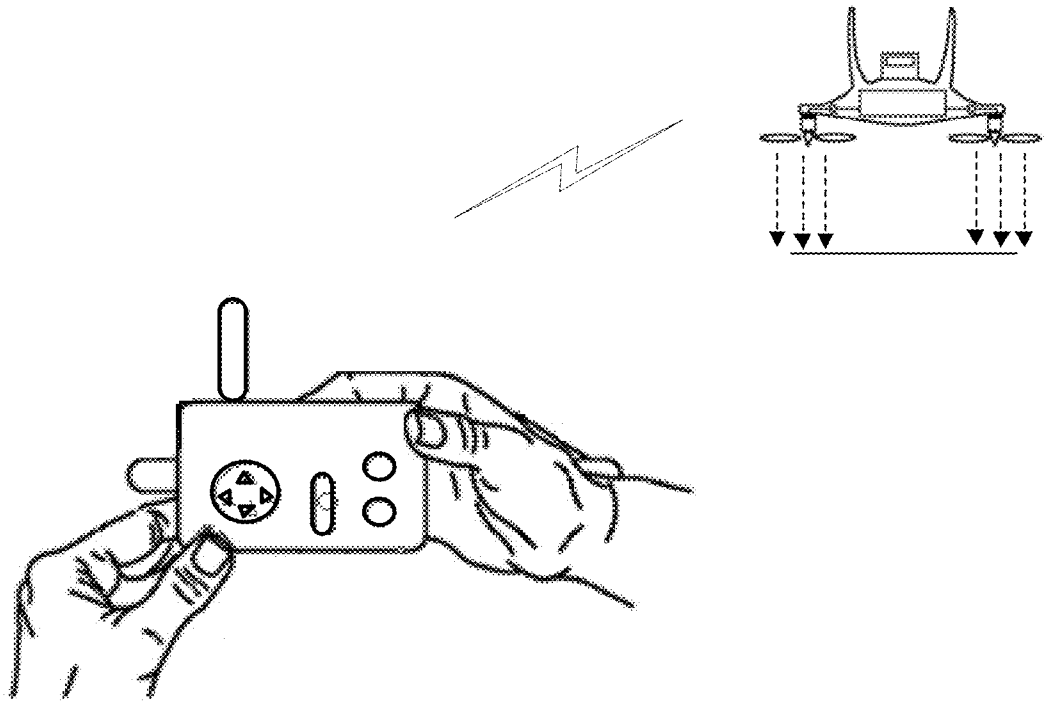
FIG. 17 is a schematic diagram of a control terminal consistent with the present disclosure.

FIG. 17 is a schematic diagram of a control terminal provided by one embodiment of the present disclosure.

As shown in FIG. 17, the control terminal may be a remote controller. The remote controller may include components such as a joystick, direction buttons, function buttons, a processor, and an antenna. The antenna may be used to receive wireless signals from the unmanned aerial vehicle, or to send wireless signals to the unmanned aerial vehicle. The joysticks, the direction buttons, the function buttons, etc., may generate corresponding operation instructions in response to user operations, and send them to the unmanned aerial vehicle. In addition, a display screen may also be provided at the remote controller, and the display screen may be used to display parameters such as the status of the unmanned aerial vehicle. In FIG. 17, the remote controller may send the rescue control instruction to the unmanned aerial vehicle, such that at least one or more of the at least two rotors of the unmanned aerial vehicle provide the second thrust in response to the rescue control instruction to perform the rescue operation.

In one embodiment, the input device may include a joystick for generating a control amount, an instruction direction, and a motor rotation instruction in response to a first user operation. The control amount, the instruction direction, the motor rotation instruction, etc. may refer to the relevant part of the embodiment for the unmanned aerial vehicle, and will not be described in detail here.

The input device may include a mode button which is used to control the unmanned aerial vehicle to switch to any one of the rescue mode, automatic rescue mode, manual rescue mode, open-loop control mode or closed-loop control mode in response to the second user operation; or to exit any one of the rescue mode, automatic rescue mode, manual rescue mode, automatic rescue return mode, open-loop control mode or closed-loop control mode.

The input device may include a display screen for displaying an interactive interface, and the interactive interface may display a virtual joystick and/or a virtual button.

For example, the remote controller may send an instruction to activate the rescue mode to the unmanned aerial vehicle in response to the operation of enabling the rescue mode, such that the unmanned aerial vehicle enters the rescue mode in response to the instruction to activate the rescue mode. The rescue mode includes but is not limited to at least one of manual rescue mode, automatic rescue mode, or automatic rescue-and-return mode.

In one embodiment, the remote controller may send a mode switching instruction to the unmanned aerial vehicle in response to the mode switching operation, and the mode switching instruction may include any of manual rescue mode selection instruction, automatic plane rescue mode selection instruction or automatic plane rescue return mode selection instruction.

In one embodiment, the control terminal may further include an output device. The output device may be used to output at least one of the following prompt information: current attitude information, initial attitude information, motor state information, bidirectional electronic speed controller state information, prompt information on failure to enter the rescue mode, current mode information, exit mode prompt information or current flight state information.

Figure 18:
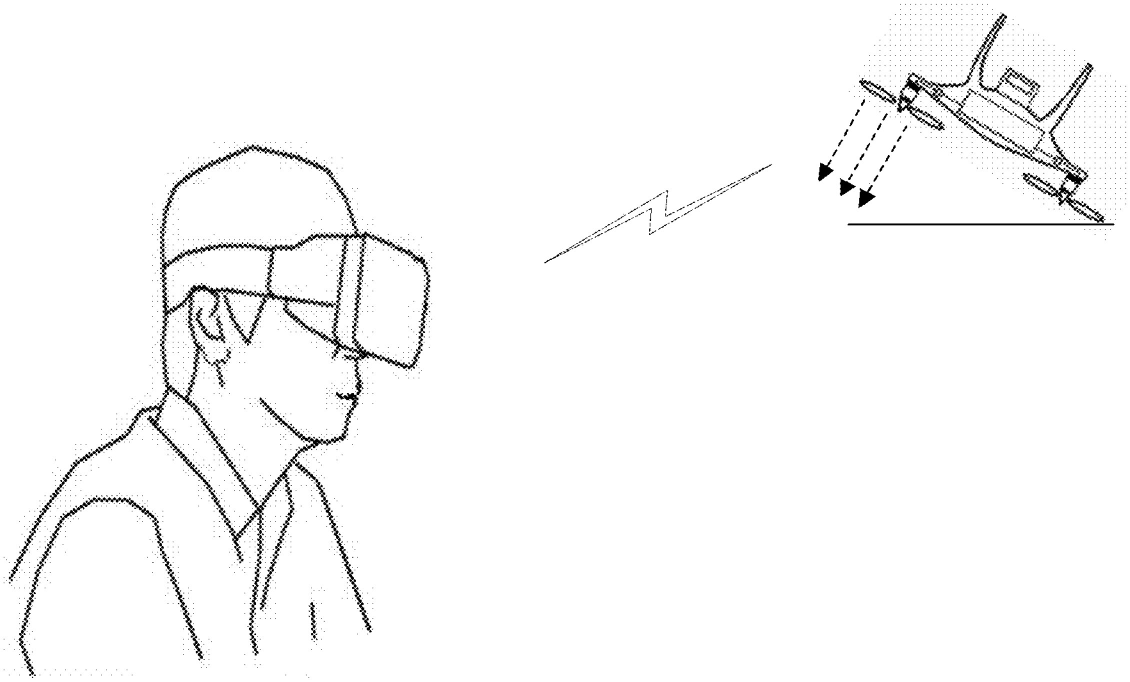
FIG. 18 is a schematic diagram of another control terminal consistent with the present disclosure.

FIG. 18 is a schematic diagram of a control terminal provided by another embodiment of the present disclosure.

As shown in FIG. 18, the control terminal may be a wearable device, such as a virtual reality device (VR), an augmented reality device (AR), etc. Specifically, it may be VR glasses or the like. The user may receive data collected from the unmanned aerial vehicle or the operating equipment mounted on the unmanned aerial vehicle through the VR glasses, and display at least part of the image data. In addition, the VR device may also have an input mechanism. For example, the user may gaze at a certain function, and then double-click the shell of the VR glasses. When the sensor of the VR glasses detects the trigger event of the double-click, the function at which the user gazes may be selected. For example, the user may select the automatic rescue mode through the VR glasses, to realize the automatic rescue operation.

In one embodiment, the control terminal may include a remote controller and a virtual reality device at the same time.

For example, the control terminal may include a remote controller and a wearable device. The remote controller may include a communication interface, and the wearable device may also include a communication interface. The communication interface of the remote controller and the communication interface of the wearable device may respectively communicate with the communication interface of the unmanned aerial vehicle.

Figure 19:
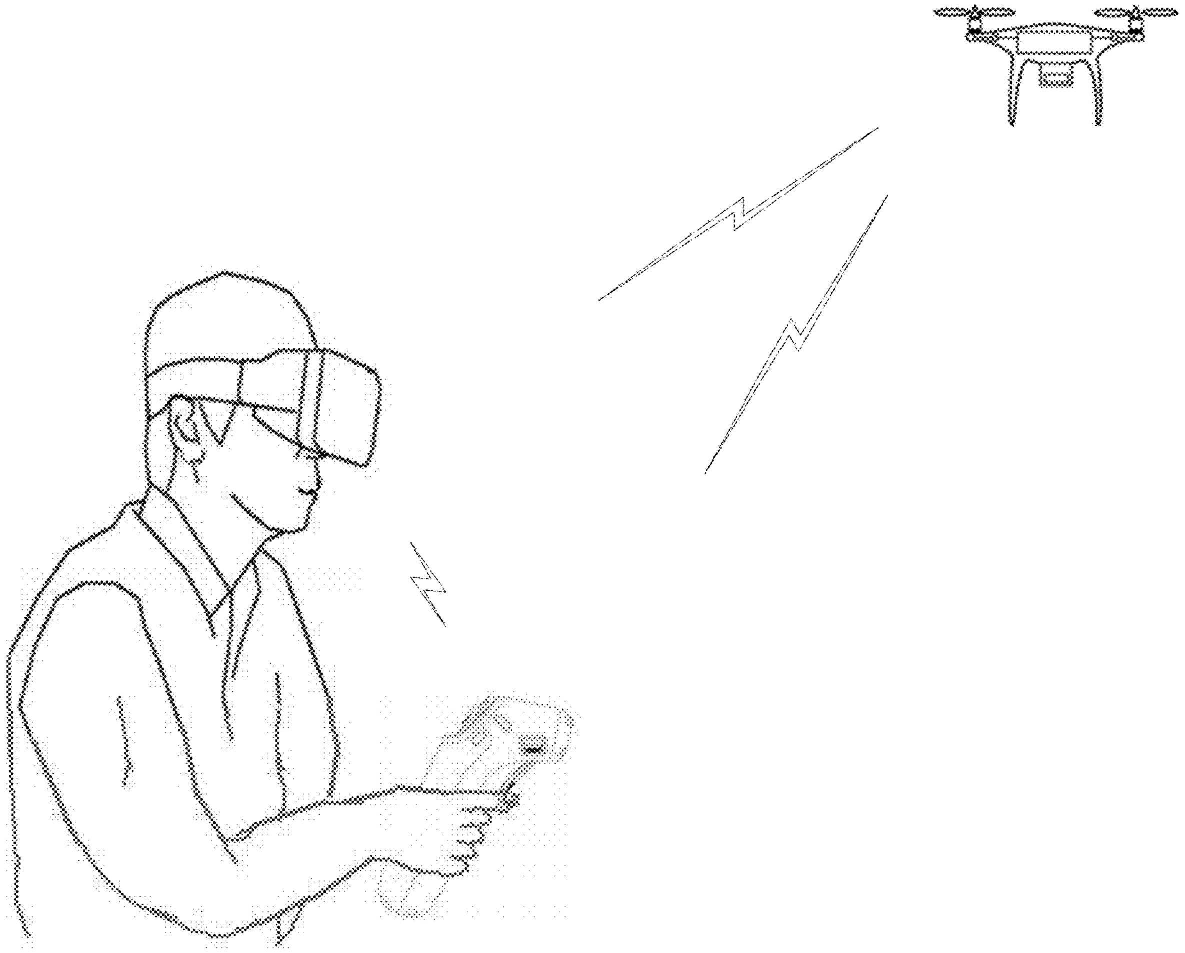
FIG. 19 is a schematic diagram of another control terminal consistent with the present disclosure.

FIG. 19 is a schematic diagram of a control terminal provided by another embodiment of the present disclosure.

As shown in FIG. 19, the user may simultaneously operate the remote controller while wearing the VR glasses, to realize the operation with the unmanned aerial vehicle. Among them, any two of the VR glasses, the remote controller and the unmanned aerial vehicle may carry out information interaction respectively.

For example, the wearable device may send the rescue mode setting instruction to the remote controller in response to the remote control setting operation. The remote controller may output setting result prompt information in response to the rescue mode setting instruction to prompt the rescue mode setting result. The setting result prompt information may be from the unmanned aerial vehicle.

For example, the wearable device may respond to the mode entry failure prompt information from the unmanned aerial vehicle that fails to enter the rescue mode, and display the mode entry failure prompt information, such that the user is able to find the unmanned aerial vehicle.

In one embodiment, the communication interface may be also used to receive guidance prompt information. The output device may include a display, and the display may be used to display the guidance prompt information to guide the user to rescue the aircraft, and the guidance prompt information may include at least one of a schematic image of the stick operation, or a parameter value of the stick operation.

In the control terminal provided by the embodiments of the present disclosure, the image information collected by the photographing device mounted on the unmanned aerial vehicle may be experienced in the VR glasses, and at the same time the remote controller may be used to control the unmanned aerial vehicle, such as to control at least one of the forward, backward, hovering, lifting, or rescue of the unmanned aerial vehicle, and may also control the attitude of the gimbal or the photographing device. The convenience of the user operation and the user experience may be improved.

The present disclosure also provides an aircraft rescue method.

Figure 20:
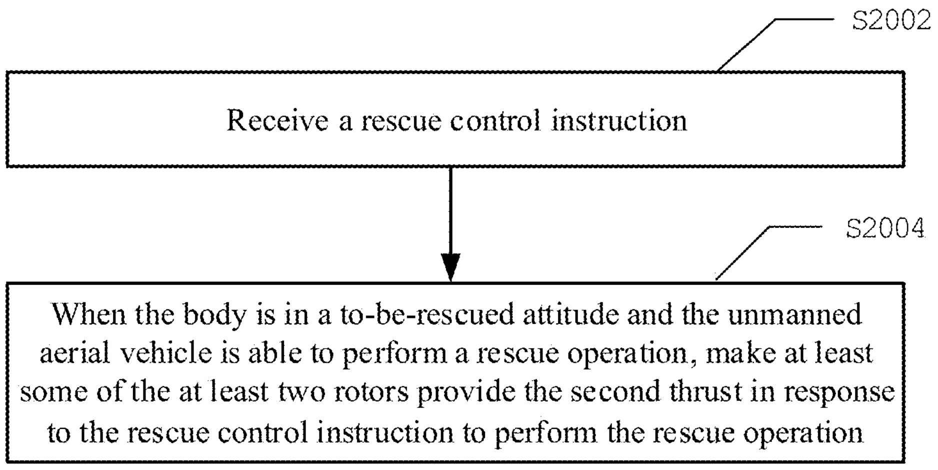
FIG. 20 is a schematic flow chart of an aircraft rescue method executed by an unmanned aerial vehicle consistent with the present disclosure.

FIG. 20 is a flowchart of an aircraft rescue method executed by an unmanned aerial vehicle. The unmanned aerial vehicle may include: a body and at least two rotors. The at least two rotors may be rotatably arranged at the body. Each of the at least two rotors may provide a first thrust in a first direction when rotating in a forward direction, and each of the at least two rotors may provide a second thrust in a second direction when rotating in a reverse direction. The first direction may be opposite to the second direction.

As shown in FIG. 20, the method includes S2002 to S2004.

At S2002, a rescue control instruction is received.

In this embodiment, for the rescue control instruction, reference may be made to the description above about the rescue control instruction.

At S2004, when the unmanned aerial vehicle is in the to-be-rescued attitude and the unmanned aerial vehicle is able to perform the rescue operation, at least one or more of the at least two rotors provide the second thrust in response to the rescue control instruction to perform the rescue operation.

In one embodiment, that at least one or more of the at least two rotors provide the second thrust in response to the rescue control instruction to perform the rescue operation may be that: at least one or more of the at least two rotors provide the second thrust in response to the first control instruction, such that the body changes from the to-be-rescued attitude to the normal take-off attitude. For specific content, reference may be made to the description above.

In one embodiment, that at least one or more of the at least two rotors provide the second thrust in response to the rescue control instruction to perform the rescue operation may include that: first one or more of the at least two rotors may respectively provide the first thrust in response to the first control instruction, and second one or more of the at least two rotors may respectively provide the second thrust in response to the first control instruction, such that the body changes from the to-be-rescued attitude to the normal take-off attitude.

In one embodiment, when the body is in the to-be-rescued attitude, the angle between the body along the first direction and the horizontal plane may be larger than a first preset angle threshold. The first preset angle threshold may be a preset threshold.

In one embodiment, that at least one or more of the at least two rotors provide the second thrust in response to the rescue control instruction to perform the rescue operation may include that the at least two rotors respond to the second control instruction and provide the second thrust when the angle is larger than a second preset angle threshold such that the body takes off in the to-be-rescued attitude.

In one embodiment, the unmanned aerial vehicle may further include an inertial measurement unit for measuring attitude information of the body. The unmanned aerial vehicle may also include a carrier disposed at the body, and the carrier may be used to carry the photographing device.

Correspondingly, the above method may further include: determining whether the unmanned aerial vehicle is able to be rescued based on the attitude information and/or the image captured by the photographing device.

In one embodiment, the above method may further include: determining rescuable rotors that can provide the second thrust based on the attitude information and/or the image captured by the photographing device, to control the rescuable rotors to perform the rescue operation.

For specific content, reference may be made to the description above.

In one embodiment, each of the at least two rotors may be connected to a corresponding motor shaft respectively.

Correspondingly, the above-mentioned method may further include: when the unmanned aerial vehicle is in the to-be-rescued attitude and the unmanned aerial vehicle is able to perform the rescue operation, sending control instructions to motors of at least one or more of the at least two rotors, to control the motors to drive the rotors corresponding to the motors to provide the second thrust.

In one embodiment, the unmanned aerial vehicle may further include a two-way electronic speed controller which is used to control the motor rotators connected to the at least two rotors to rotate forward or reverse, to drive the at least two rotors to rotate forward or reverse respectively. When the unmanned aerial vehicle is able to perform the rescue operation, the propellers of at least one or more of the at least two rotors may be able to rotate forward or reverse and may not interfere in the current attitude, and the two-way electronic governor may be able to work normally.

In one embodiment, the respective forward and reverse directions of the at least two rotors may be determined based on the respective propeller angles of the at least two rotors.

In one embodiment, the unmanned aerial vehicle may have a rescue mode, and the rescue mode may include at least one of a manual rescue mode, an automatic rescue mode, or an automatic rescue-and-return mode.

In one embodiment, each of the at least two rotors may have a rotor identification.

The above method may further include: storing a rescue strategy, such that the unmanned aerial vehicle is able to perform the rescue operation based on the rescue strategy in the automatic rescue mode or the automatic rescue-and-return mode. The rescue strategy may be stored in memory. The rescue strategy may include at least one of a first mapping relationship between angles and rotor identifications, a second mapping relationship between angles, rotor identifications, and control amount modulus, or a third mapping relationship between angles, rotor identifications, attribute information and control amount modulus. The attribute information may include at least one of voltage information of power supply, weight information of unmanned aerial vehicle, air pressure information of the environment, or the number of times the rescue control instruction is triggered.

In one embodiment, when the unmanned aerial vehicle is in the to-be-rescued attitude, the projection of the resultant force direction of the thrust provided by the at least two rotors on the vertical line passing through the center of gravity of the unmanned aerial vehicle may point to the center of the earth, and/or, the respective propellers of the at least two rotors may interfere with the landing surface in the current attitude.

In one embodiment, when the unmanned aerial vehicle is able to perform rescue operations, the propellers of at least one or more of the at least two rotors may be able to rotate forward or reverse, and the propellers of at least one or more of the at least two rotors may be separated from the landing surface in the current attitude.

In one embodiment, when the unmanned aerial vehicle is in the normal take-off attitude, the projection of the resultant force direction of the thrust provided by the at least two rotors rotating forward on the vertical line passing through the center of gravity of the unmanned aerial vehicle may be opposite to a direction pointing to the center of the earth, and/or, the respective propellers of the at least two rotors may be separated from the landing surface in the current attitude.

In one embodiment, the unmanned aerial vehicle may further include a communication interface for communicating with the control terminal.

Correspondingly, receiving the rescue control instruction may include: receiving the rescue control instruction from the communication interface of the control terminal through the communication interface of the unmanned aerial vehicle.

In one embodiment, the rescue mode of the unmanned aerial vehicle may include a manual rescue mode and an automatic rescue mode.

In the manual rescue mode, the rescue control instruction may include the control amount modulus, the direction of the instruction, or the motor rotation instruction input by the joystick of the control terminal.

In the automatic rescue mode, the rescue control instruction may include the motor rotation instruction.

In one embodiment, for the manual rescue mode, at least one or more of the at least two rotors may be able to provide the second thrust in response to the control amount modulus, the instruction direction or the motor rotation instruction.

In one embodiment, the input of the manual rescue mode may include, the control amount modulus, the instruction direction, or the motor rotation instruction. Correspondingly, the output of the manual rescue mode may include: the rotor identification or control amount modulus corresponding to the motors performing reverse rotation.

In one embodiment, open-loop control may be performed on at least one or more of the at least two rotors based on the initial attitude information and the motor rotation instruction to provide the second thrust.

In one embodiment, the input of the open-loop control may include: initial attitude information, take-off attitude threshold, motor rotation instruction and attribute information. The attribute information may include at least one of voltage information of the power supply, weight information of the unmanned aerial vehicle, atmospheric pressure information of the environment, or the number of times the rescue control instruction is triggered.

Correspondingly, the output of the open-loop control may include stick identification, control amount modulus, or instruction output duration.

In one embodiment, closed-loop control may be performed on at least one or more of the at least two rotors based on the current attitude information and the motor rotation instruction to provide the second thrust.

For example, the input of the closed-loop control may include current attitude information, take-off attitude threshold and motor rotation instruction. In another example, the input of the closed-loop control may include current attitude information, take-off attitude threshold, motor rotation instruction and attribute information. The attribute information may include at least one of voltage information of the power supply, weight information of the unmanned aerial vehicle and atmospheric pressure information of the environment.

Correspondingly, the output of the closed-loop control may include: rotor identification, or control amount modulus.

In one embodiment, the above method may further include: converting the control amount modulus into the safe control amount modulus.

Correspondingly, in the manual rescue mode, the rescue control instruction may include the safe control amount modulus, the instruction direction and the motor rotation instruction.

In one embodiment, the above method may further include that: in the manual rescue mode, the unmanned aerial vehicle sends guidance prompt information to the communication interface of the control terminal through the communication interface of the unmanned aerial vehicle, such that the display screen of the control terminal displays prompt information to guide the user to rescue the aircraft.

In one embodiment, the guidance prompt information may include at least one of a schematic image of the stick operation or a parameter value of the stick operation. The schematic image of the stick operation may be generated based on the parameter value of the stick operation, and the parameter value of the stick operation may be determined based on at least on the attitude information of the body.

In one embodiment, the above method may further include: receiving a rescue mode setting instruction from the communication interface of the control terminal through the communication interface of the unmanned aerial vehicle. The rescue mode setting instruction may include at least one of a rescue strategy setting instruction, and/or a takeoff attitude threshold setting instruction.

In one embodiment, the above method may further include: replacing the thrust output by at least one or more of the at least two rotors with the thrust output by one of the at least two rotors other than the at least one or more of the rotors or the resultant force output by multiple rotors.

In one embodiment, the above method may further include: monitoring the power failure of the motors corresponding to the at least two rotors, to replace the motors with power failure.

In one embodiment, the body may include a sensor assembly for collecting sensor data, and the sensor assembly may include at least one of an inertial measurement unit or an image sensor. The sensor assembly may be arranged at the unmanned aerial vehicle, or may be fixed on the unmanned aerial vehicle in the form of operating equipment, which is not limited here.

The present disclosure also provides an aircraft rescue method applicable to a control terminal. The control terminal may be connected with an unmanned aerial vehicle in communication.

Figure 21:
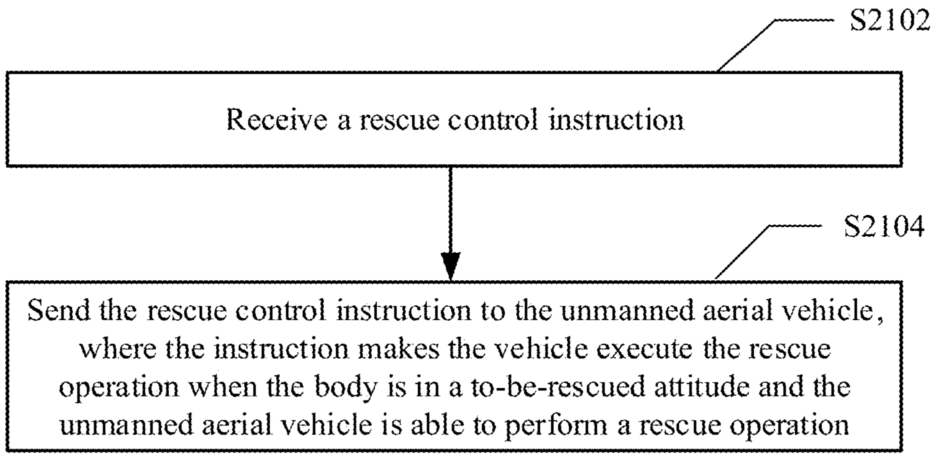
FIG. 21 is a schematic flow chart of an aircraft rescue method executed by a control terminal consistent with the present disclosure.

FIG. 21 is a flowchart of an aircraft rescue method executed by the control terminal provided by one embodiment of the present disclosure.

As shown in FIG. 21, the method includes S2102 and S2104.

At S2102, a rescue control instruction is obtained.

At S2104, the rescue control instruction is sent to the unmanned aerial vehicle, such that the rescue control instruction controls the unmanned aerial vehicle to perform the rescue operation when the unmanned aerial vehicle is in the to-be-rescued attitude and is able to perform the rescue operation.

The control terminal may include at least one of a remote controller or a wearable device.

In one embodiment, the rescue control instruction may include at least one of a control instruction including at least one of the control stick amount, instruction direction, and motor rotation instruction and generated based on a first user operation on the joystick of the control terminal, a control instruction for controlling the unmanned aerial vehicle to switch to any one of rescue mode, automatic rescue mode, manual rescue mode, open-loop control mode or closed-loop control mode and generated based on the second user operation on the mode button on the control terminal, or a control instruction for exiting any one of rescue mode, automatic rescue mode, manual rescue mode, automatic rescue return mode, open-loop control mode or closed-loop control mode. For example, the rescue control instruction may be obtained through a virtual joystick and/or virtual buttons. The control terminal may include a display screen for displaying an interactive interface, and the interactive interface may display the virtual joystick and/or virtual buttons.

In one embodiment, the control terminal may include a remote controller and a wearable device. The remote controller may include a communication interface, and the wearable device may include another communication interface. The communication interface of the remote controller and the communication interface of the wearable device may respectively communicate with the communication interface of the unmanned aerial vehicle.

In one embodiment, the above method may further include that: firstly, the wearable device sends a rescue mode setting instruction to the remote controller in response to the remote control setting operation; and then the remote controller outputs setting result prompt information in response to the rescue mode setting instruction, to prompt the rescue mode setting result.

In one embodiment, the above method may further include that: the wearable device responds to the mode entry failure prompt information from the unmanned aerial vehicle that fails to enter the rescue mode, and displays the mode entry failure prompt information, such that the user is able to find the unmanned aerial vehicle.

In one embodiment, the above method may further include: in response to the rescue mode activation operation, sending the rescue mode activation instruction to the unmanned aerial vehicle, such that the unmanned aerial vehicle enters the rescue mode in response to the rescue mode activation instruction.

In one embodiment, the above method may also include: in response to the mode switching operation, sending a mode switching instruction to the unmanned aerial vehicle. The mode switching instruction includes any of a manual rescue mode selection instruction, an automatic rescue mode selection instruction or an automatic rescue return mode selection instruction.

In one embodiment, the above method may further include: outputting prompt information. The prompt information may include at least one of current attitude information, initial attitude information, motor state information, bidirectional electronic speed controller state information, prompt information on failure to enter the rescue mode, current mode information, exit mode prompt information or current flight state information.

In an embodiment, the above method may further include receiving guidance prompt information first, and then displaying the guidance prompt information to guide the user to rescue the aircraft. The guidance prompt information may include at least one of a schematic image of the joystick or a parameter value of the joystick. The parameter value of the joystick in the guidance prompt information may be determined by the method of determining the value of the stick parameter in the open-loop control, such as based on the attitude information of the unmanned aerial vehicle.

Figure 22:
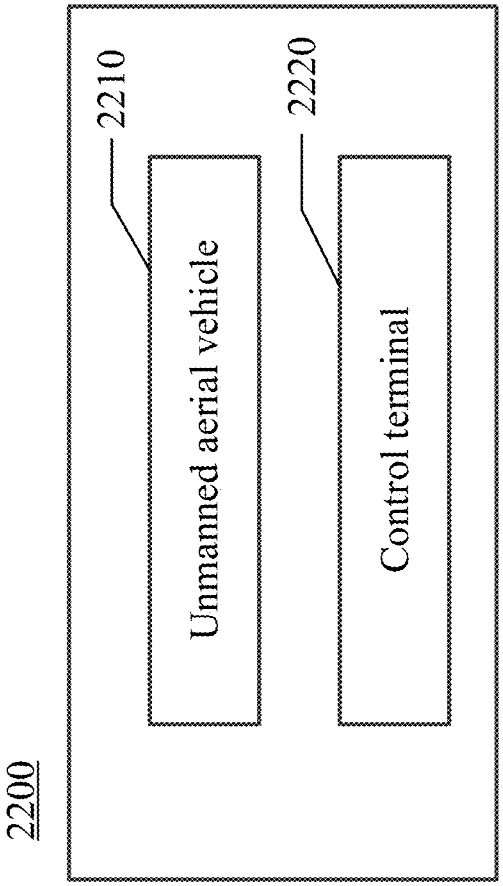
FIG. 22 is a schematic diagram of an aircraft rescue system consistent with the present disclosure.

The present disclosure also provides an aircraft rescue system. FIG. 22 is a schematic diagram of an aircraft rescue system provided by one embodiment of the present disclosure.

As shown in FIG. 22, the aircraft rescue system includes an unmanned aerial vehicle 2210 and a control terminal 2220.

The unmanned aerial vehicle 2210 may include a body, at least two rotors, and a first memory. The at least two rotors may be rotatably arranged at the body. Each of the at least two rotors may provide a first thrust in a first direction when rotating forward, and each of the at least two rotors may provide a second thrust in a second direction when rotating reverse. The first direction may be opposite to the second direction. The first memory may be configured to store executable instructions. When being executed by one or more processors, the executable instructions may cause the one or more processors to execute the method provided by various embodiments of the present disclosure.

The control terminal 2220 may include a second memory. The second memory may be configured to store executable instructions. When being executed by one or more processors, the executable instructions may cause the one or more processors to execute the method provided by various embodiments of the present disclosure.

For details of the unmanned aerial vehicle 2210 and the control terminal 2220, reference may be made to the description above.

The function interaction of the aircraft rescue system is described as an example below.

Figure 23:
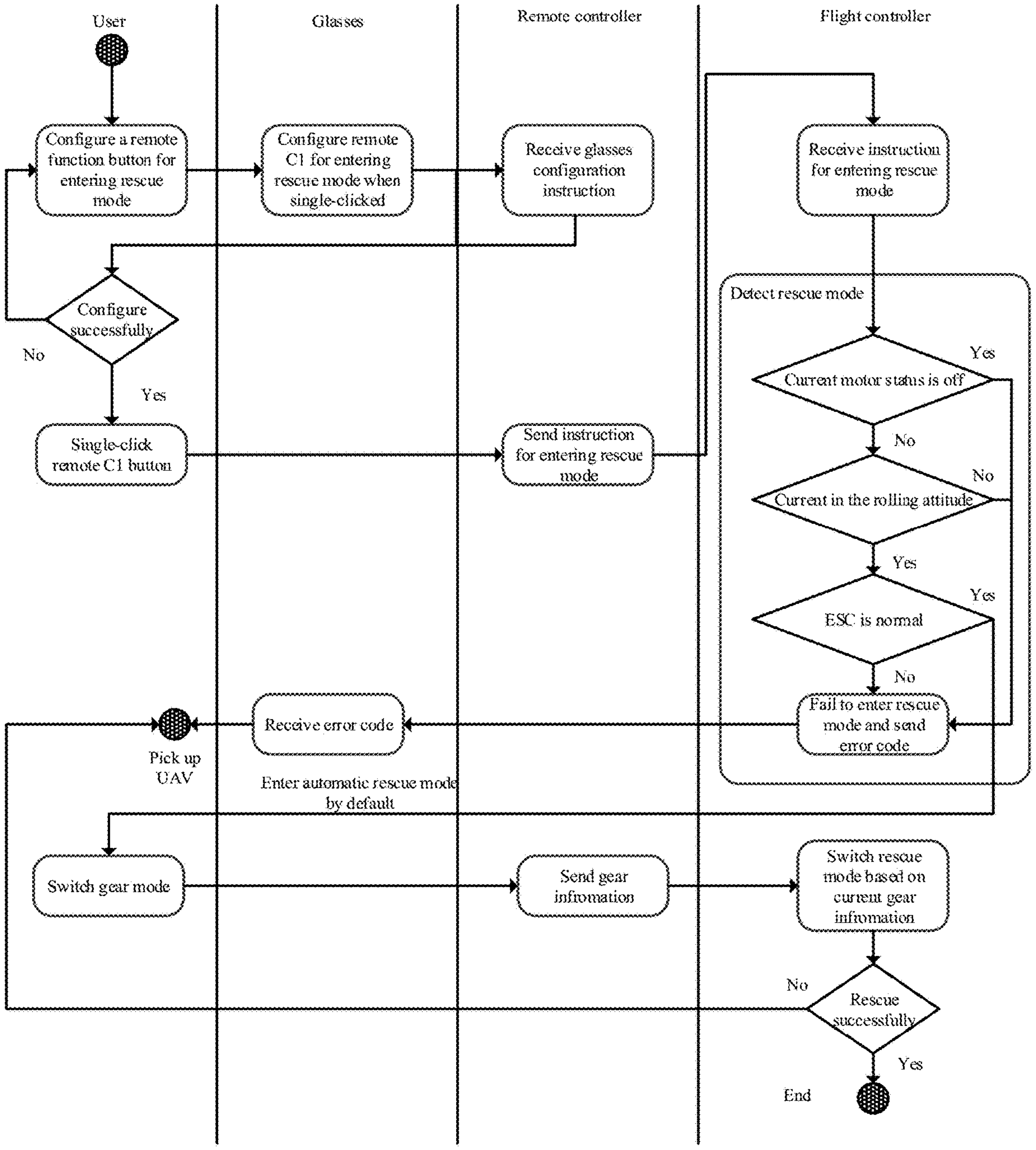
FIG. 23 is a schematic diagram of function interaction of an aircraft rescue system consistent with the present disclosure.

FIG. 23 is a schematic diagram of functional interaction of the aircraft rescue system provided by one embodiment of the present disclosure.

As shown in FIG. 23, the user uses the glasses to configure the remote control function button of the remote controller which controls to enter the aircraft rescue mode when single clicking (C1). The glasses send the setting instruction to the remote controller, such that the remote controller performs corresponding settings. The remote controller feeds back the configuration result to the user (for example, it may be displayed through glasses). And when the configuration is successful, the user is able to click the C1 button of the remote controller that has been successfully configured. When the configuration fails, it is up to the user to reconfigure. The remote controller may send an instruction to enter the aircraft rescue mode to the flight controller of the unmanned aerial vehicle in response to the trigger operation of the C1 button by the user.

In response to the instruction to enter the aircraft rescue mode, the flight controller enters the rescue mode detection, such as judging whether the current motor status is off. When the current motor status is off, the error code of the failure to enter the rescue mode may be fed back to the glasses. When the current motor status is not off, the current attitude may be detected continuously. When the unmanned aerial vehicle is currently in the normal take-off attitude, the error code of the failure to enter the rescue mode may be feed back to the glasses. When it is currently in the to-be-rescued attitude, whether the electronic speed controller is normal may be determined subsequently. When the electronic speed controller is not normal, the error code of the failure to enter the rescue mode may be fed back to the glasses. When the electronic speed controller is normal, it may enter the automatic rescue mode by default. During this period, the user may be able to select gears, such as selecting manual rescue mode, automatic rescue mode or automatic rescue-and-return mode, etc. The gear selected by the user may be sent to the flight controller through the remote controller, such that the flight controller may be able to switch the corresponding rescue mode according to the current gear. When the rescue is successful, the process may be completed. When the rescue fails, the user may be prompted to pick up the unmanned aerial vehicle through the glasses or remote controller.

Figure 24:
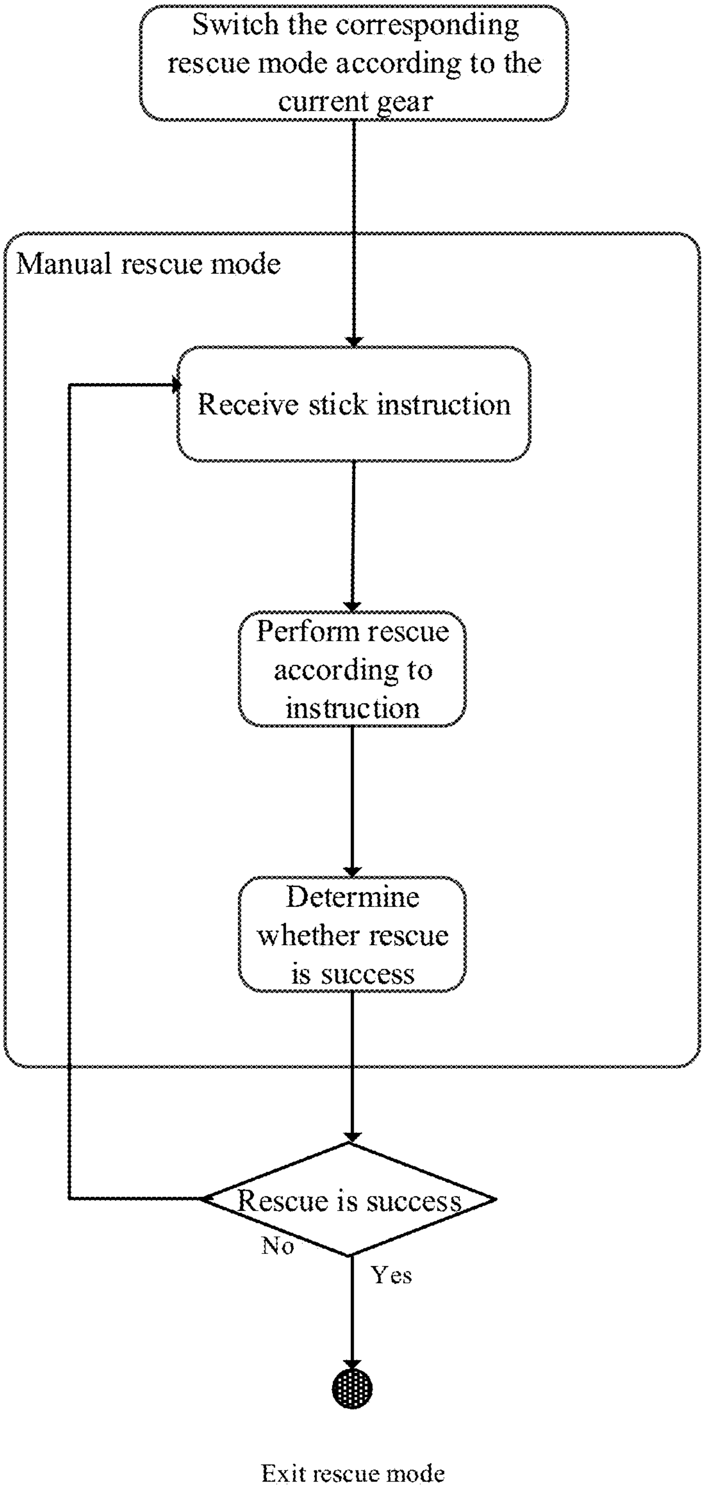
FIG. 24 is a schematic flow chart of flight control operation in a manual rescue mode consistent with the present disclosure.

FIG. 24 is a flow chart of operations performed by the flight controller in the manual rescue mode provided by one embodiment of the present disclosure.

As shown in FIG. 24, after the flight controller switches to the corresponding rescue mode according to the current gear, when the corresponding rescue mode is the manual rescue mode, it responds to the stick operation instruction from the remote controller and perform rescue according to the stick operation instruction. The user may judge whether the rescue is successful based on the attitude information of the unmanned aerial vehicle and the image information collected by the photographing equipment. When the rescue is successful, it may exit the rescue mode. Otherwise, the user may continue to rescue the aircraft by stick operation.

Figure 25:
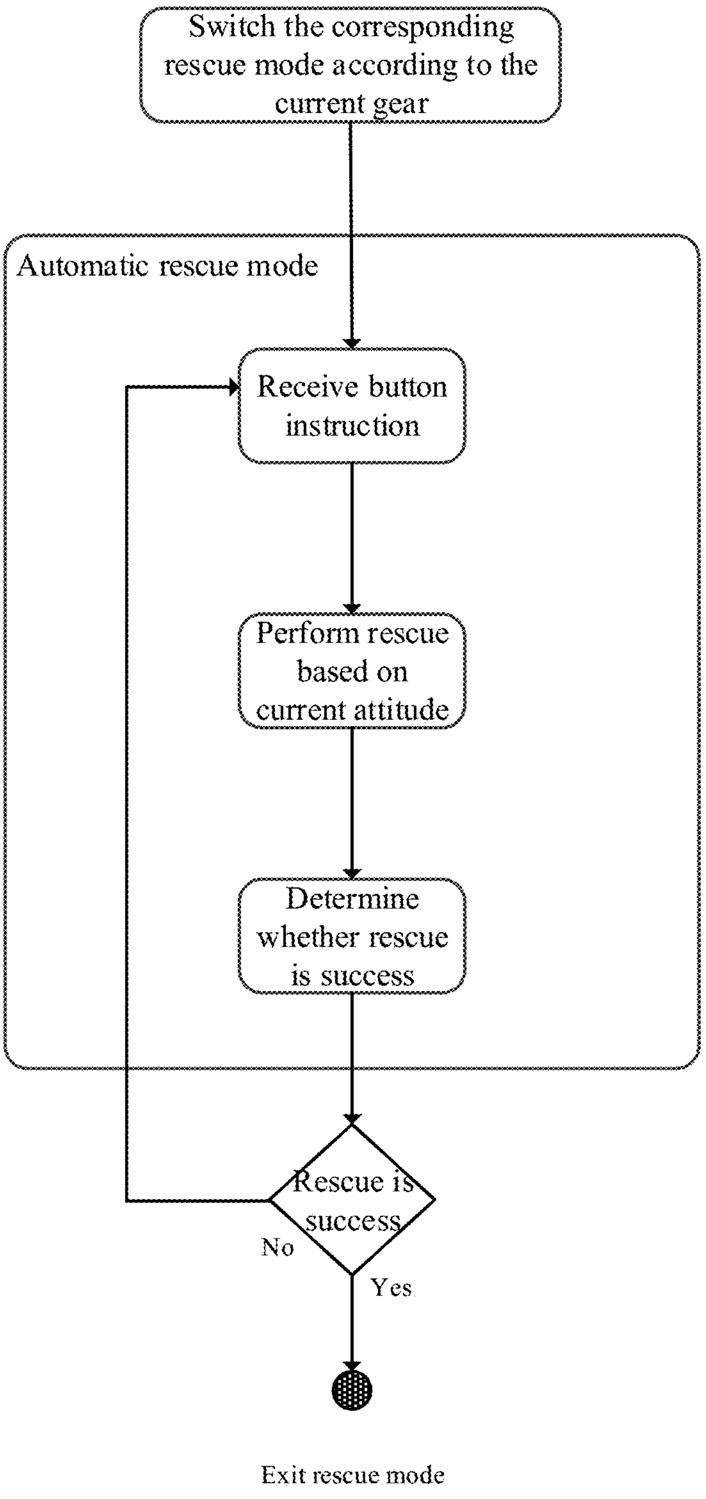
FIG. 25 is a schematic flow chart of flight control operation in an automatic rescue mode consistent with the present disclosure.

FIG. 25 is a flow chart of operations performed by the flight controller in the automatic rescue mode provided by one embodiment of the present disclosure.

As shown in FIG. 25, after the flight controller switches the corresponding rescue mode according to the current gear and when the corresponding rescue mode is the automatic rescue mode, it responds to the button instructions from the remote controller and automatically perform the rescue operation according to the current attitude. The unmanned aerial vehicle may judge whether the current rescue is successful based on the current attitude information and/or the collected image information, and exit the rescue mode when the rescue is successful. Otherwise, the flight controller may perform the rescue operation again based on the current attitude information until the stop conditions such as reaching the threshold for the number of attempts, reaching the threshold for the duration of attempts, or the power is less than the threshold are met.

Figure 26:
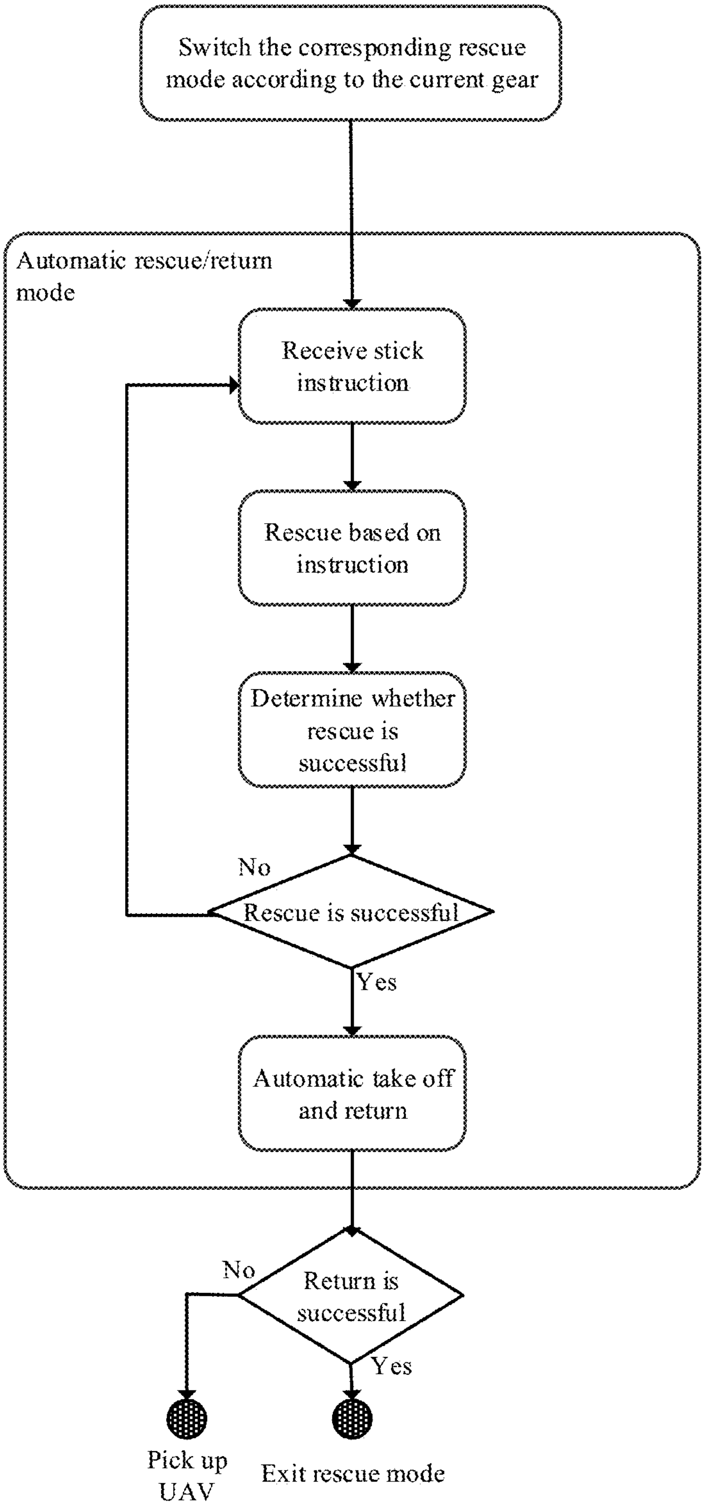
FIG. 26 is a schematic flow chart of flight control operation in an automatic rescue-and-return mode consistent with the present disclosure.

FIG. 26 is a flow chart of operations performed by the flight controller in the automatic rescue-and-return mode provided by one embodiment of the present disclosure.

As shown in FIG. 26, after the flight controller switches the corresponding rescue mode according to the current gear and when the corresponding rescue mode is the automatic rescue-and-return mode, it responds to the stick operation instruction (or button instruction) from the remote controller, and automatically performs the rescue operation according to the instruction or the current attitude. Based on the current attitude information and/or the collected image information, the unmanned aerial vehicle may judge whether the current rescue is successful. When the rescue is successful, it may perform automatic take-off and return functions. After the successful return, it may exit the automatic rescue-and-return mode. Otherwise, the user may be prompted to pick up the unmanned aerial vehicle.

Figure 27:
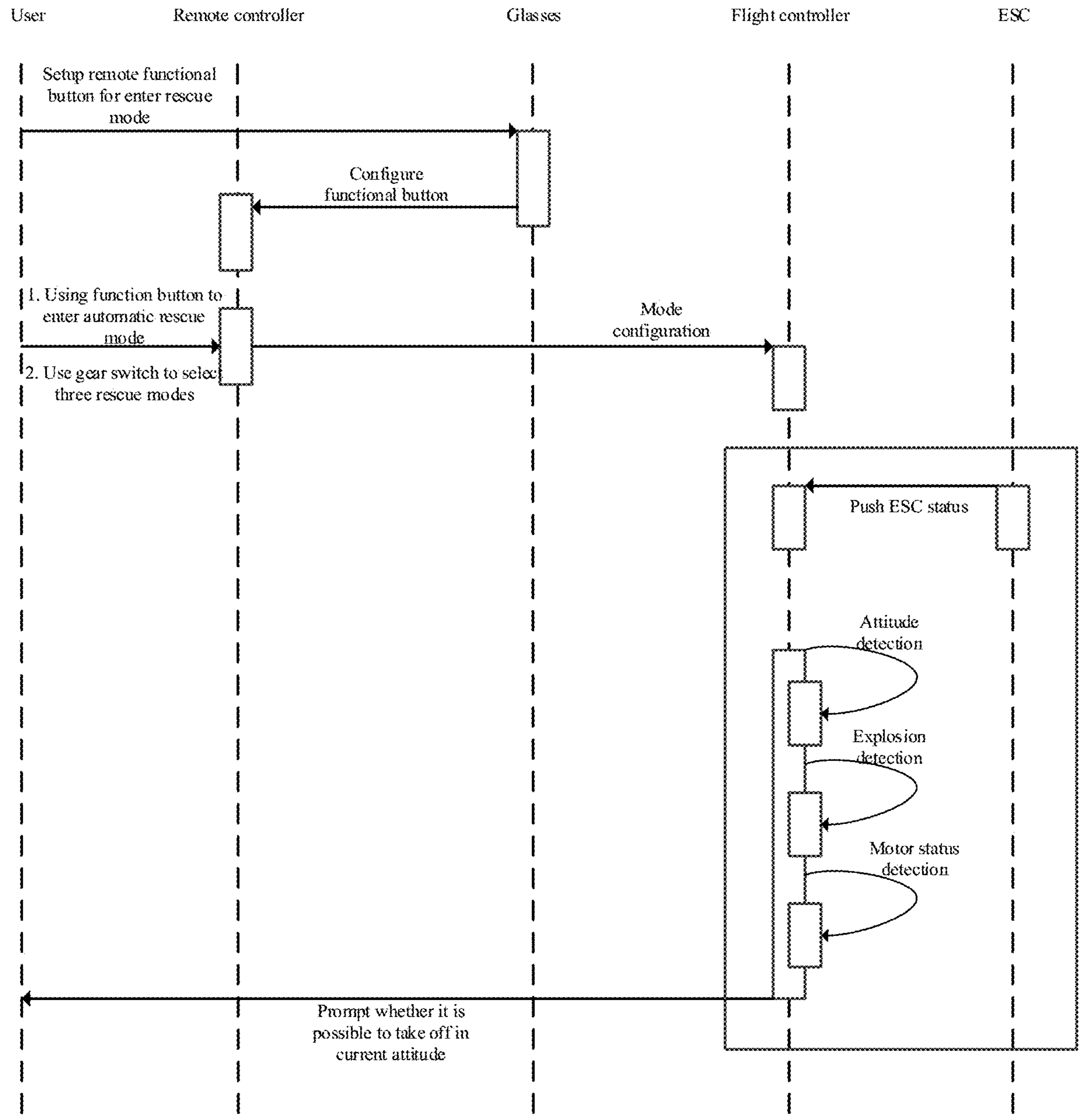
FIG. 27 is a timing diagram of prompting whether it is able to normally take off consistent with the present disclosure.

FIG. 27 is a sequence diagram of the function of prompting whether it is able to normal take off provided by one embodiment of the present disclosure.

As shown in FIG. 27, the user uses the glasses to configure the remote control function button for entering the rescue mode. When the configuration is successful, the user is able to enter the automatic rescue mode based on the function button, or choose to enter any one of the manual rescue mode, automatic rescue mode or automatic rescue-and-return mode based on the gear switch. The remote controller sends the mode selected by the user to the flight controller. The flight controller continuously receives the electronic speed controller status from the electronic speed controller. During this period, the flight controller may perform at least one of attitude detection, bomber detection, or motor state detection, and prompt the user whether the current state can take off normally based on the detection results.

Figure 28:
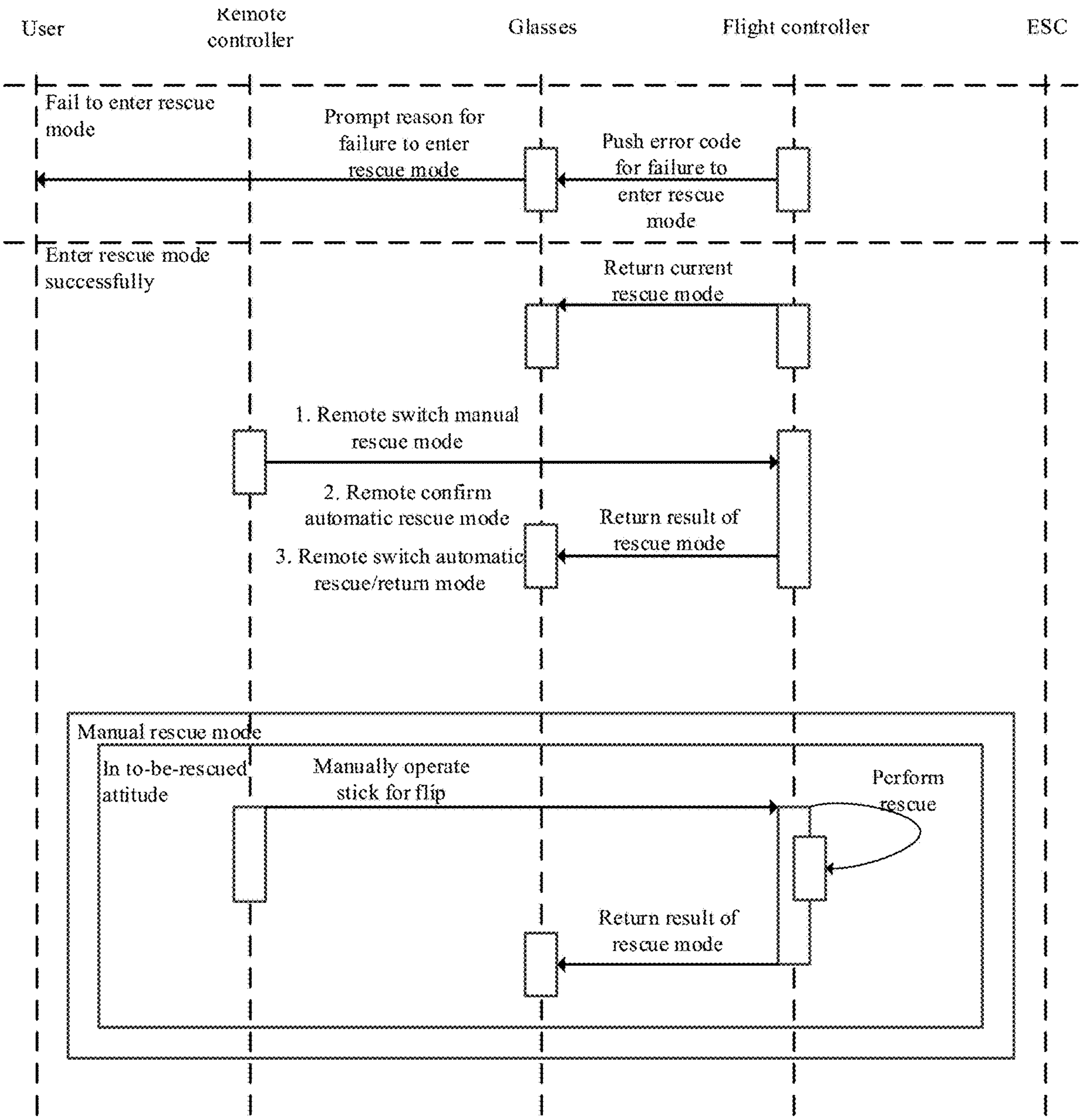
FIG. 28 is a timing diagram of entering a rescue mode and a manual rescue function consistent with the present disclosure.

FIG. 28 is a sequence diagram of entering the rescue mode and the manual rescue function according to one embodiment of the present disclosure.

As shown in FIG. 28, when entering the rescue mode fails, the flight controller pushes an error code to the glasses, and the glasses prompts the user failure to enter the rescue mode and its reasons based on the received error code.

When the rescue mode is successfully entered, the flight controller may feed the current rescue mode to the glasses. The user may use the remote controller to switch between the manual rescue mode, the automatic rescue mode or the automatic rescue-and-return mode, and send the selected mode to the flight controller. The flight controller may return the rescue mode result to the glasses.

For the manual rescue mode, when the unmanned aerial vehicle is in the to-be-rescued attitude, the user may use the remote controller to manually operate and flip the stick, and the operation instruction may be sent to the flight controller to perform the rescue operation. The flight controller may return the rescue mode result to the glasses.

Figure 29:
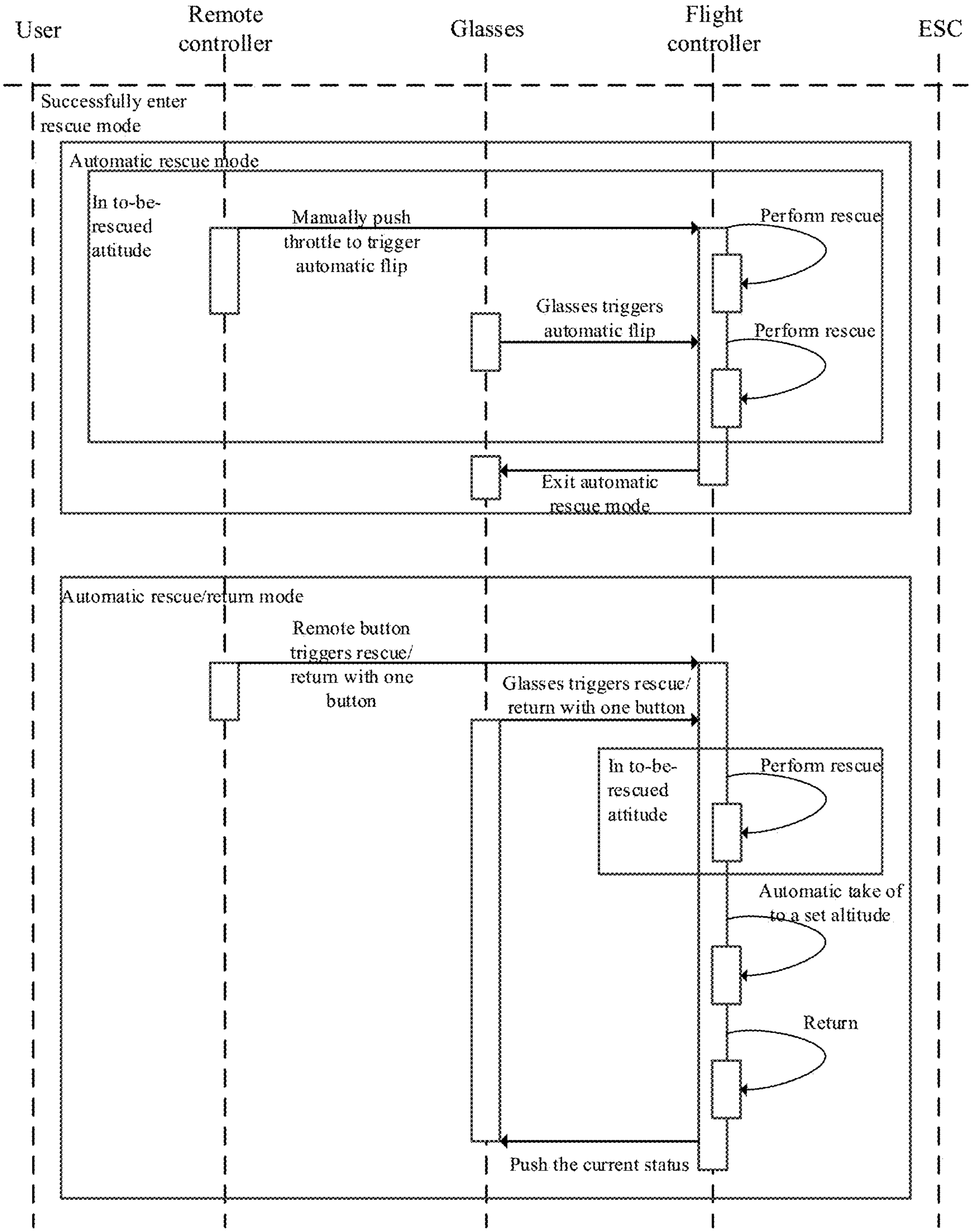
FIG. 29 is a timing diagram of an automatic aircraft rescue function and an automatic aircraft rescue-and-return function consistent with the present disclosure.

FIG. 29 is a sequence diagram of the automatic rescue function and the automatic rescue-and-return function provided by one embodiment of the present disclosure.

As shown in FIG. 29, for the automatic rescue mode, when the unmanned aerial vehicle is in the to-be-rescued attitude, the user may use the remote controller to manually push the throttle to trigger the automatic rescue (such as flip rescue) and send it to the flight controller. In addition, the user may also use the glasses to trigger the automatic rescue (such as flip rescue) and send it to the flight controller. The flight controller may execute the rescue operation. After successfully rescuing, the flight controller may send prompt information to the glasses, such as exiting the automatic rescue mode.

For the automatic rescue-and-return mode, the user may use the remote control return button to trigger the automatic rescue-and-return, and send it to the flight controller. In addition, the user may also use the glasses to trigger the automatic rescue-and-return, and send it to the flight controller. When the unmanned aerial vehicle is in the to-be-rescued attitude currently, the flight controller may perform the rescue operation. After the rescue is successful, the unmanned aerial vehicle may automatically take off to the return altitude, and then perform the automatic return operation. During this period, the flight controller may push the current flight status of the aircraft to the glasses.

The embodiments of the present disclosure may realize the remote rescue function by controlling at least one or more of the propellers to rotate reverse, and the function interaction may be humanized, to improve the user experience.

The present disclosure also provides a computer-readable storage medium. The computer-readable storage medium may be configured to store executable instructions. When the executable instructions are executed by one or more processors, the method provided by various embodiments of the present disclosure may be implemented.

The computer-readable storage medium may be an internal storage unit of the device/system/equipment described in any of the foregoing embodiments of the present disclosure. The computer-readable storage medium may also be independent, and may not be installed in the device/system/equipment described in any of the foregoing embodiments of the present disclosure. The computer-readable storage medium may be configured to store one or more programs. When the one or more programs are executed, the method provided by various embodiments of the present disclosure may be implemented.

The computer-readable storage medium may be a non-volatile computer-readable storage medium, such as but not limited to: a portable computer disk, a hard disk, a random access memory (RAM), a read-only memory (ROM), an erasable programmable read-only memory (EPROM or flash memory), a portable compact disk read-only memory (CD-ROM), an optical storage device, a magnetic storage device, or any suitable combination of the above. In the present disclosure, the computer-readable storage medium may be any tangible medium that contains or stores a program that can be used by or in conjunction with an instruction execution system, apparatus, or device. For example, according to an embodiment of the present disclosure, the computer-readable storage medium may include one or more memories other than the above-described ROM and/or RAM and/or ROM and RAM.

Another aspect of the present disclosure also provides a computer program product, including a computer program, and the computer program implements the method as described above when executed.

When the computer program is executed by a processor, the above-mentioned functions defined in the system/apparatus of the embodiments of the present disclosure are performed.

In one embodiment, the computer program may rely on tangible storage media such as optical storage devices or magnetic storage devices. In another embodiment, the computer program may also be transmitted and distributed in the form of a signal on a network medium, downloaded and installed through a communication system, and/or installed from a removable medium. The program codes contained in the computer program may be transmitted by any appropriate network medium, including but not limited to: wireless, wired, or any appropriate combination of the above.

According to the embodiments of the present disclosure, the program codes for executing the computer programs provided by the embodiments of the present disclosure may be written in any combination of one or more programming languages. Specifically, these computing programs may be implemented by using high-level procedural and/or object-oriented programming languages, and/or assembly/machine language. Programming languages include, but are not limited to, Java, C++, python, C or similar programming languages. The program codes may execute entirely on the computing device, partly on the user device, partly on the remote computing device, or entirely on the remote computing device or server. In cases involving a remote computing device, the remote computing device may be connected to the user computing device through any kind of network, including a local area network (LAN) or a wide area network (WAN), or, alternatively, may be connected to an external computing device (such as through the Internet using an Internet service provider).

The terminology used in the present disclosure is for the purpose of describing particular embodiments only and is not intended to limit the scope of the present disclosure.

The term "and/or" used in the present disclosure and the appended claims refers to any combination of one or more of the associated listed items and all possible combinations, and includes these combinations.

The above are only specific implementations of embodiments of the present disclosure, but the scope of the present disclosure is not limited to this. One of ordinary skill in the art can easily think of various equivalents within the technical scope disclosed in the present disclosure. These modifications or replacements shall be included within the scope of the present disclosure. Therefore, the protection scope of the present invention shall be subject to the protection scope of the claims.

What is claimed is:

1. An aerial vehicle comprising:

a body;

at least two rotors rotatably disposed at the body, each of the at least two rotors being configured to provide a first thrust in a first direction when rotating in a forward direction and provide a second thrust in a second direction opposite to the first direction when rotating in a reverse direction; and at least one processor configured to:

in response to the body being in a to-be-rescued attitude in which at least one propeller of the at least two rotors interferes with a landing surface, determine whether the at least two rotors are capable of conducting rescue, the determining whether the at least two rotors are capable of conducting rescue comprising determining, for each of the at least two rotors, whether a propeller of the rotor is separated from the landing surface; and in response to determining that only one or more first rotors of the at least two rotors being capable of conducting rescue, control to perform a rescue operation by controlling the one or more first rotors to provide the second thrust and controlling one or more second rotors of the at least two rotors other than the one or more first rotors to stop rotating, the one or more second rotors being associated with the at least one propeller that interferes with the landing surface.

2. The aerial vehicle according to claim 1, wherein:

the at least one processor is configured to send a control instruction to control the one or more first rotors to provide the second thrust, to change the body from the to-be-rescued attitude to a normal take-off attitude.

3. The aerial vehicle according to claim 1, wherein the at least one processor is further configured to, in response to both the one or more first rotors and the one or more second rotors being capable of conducting rescue:

control the one or more first rotors to each provide the second trust; and control the one or more second rotors to each provide the first thrust.

4. The aerial vehicle according to claim 1, wherein:

when the body is in the to-be-rescued attitude, an angle between the body along the first direction and a horizontal plane is larger than a preset angle threshold.

5. The aerial vehicle according to claim 4, wherein:

the preset angle threshold is a first preset angle threshold; and the at least one processor is further configured to, in response to the angle being larger than a second preset angle threshold, control the at least two rotors to provide the second thrust when, to cause the body to take off in the to-be-rescued attitude.

6. The aerial vehicle according to claim 1, further comprising:

an inertial measurement unit configured to measure attitude information of the body; and a photographing device;

wherein the at least one processor is further configured to determine the one or more first rotors based on at least one of the attitude information or an image captured by the photographing device.

7. The aerial vehicle according to claim 1, further comprising:

a two-way electronic speed controller configured to control forward rotation or reverse rotation of motor rotators connected to the at least two rotors respectively, to drive the at least two rotors respectively to rotate forward or reversely;

wherein the at least one processor is further configured to determine whether the at least two rotors are able to perform the rescue operation by determining at least one of:

whether propellers of the at least two rotors interfere with each other in a current attitude, or whether the two-way electronic speed controller is able to work normally.

8. The aerial vehicle according to claim 1, wherein:

the forward direction and the reverse direction of one rotor of the at least two rotors are determined based on a propeller angle of the one rotor.

9. The aerial vehicle according to claim 1, wherein:

the aerial vehicle has a rescue mode, and the rescue mode includes at least one of a manual rescue mode, an automatic rescue mode, or an automatic rescue-and-return mode.

10. The aerial vehicle according to claim 9,
wherein each of the at least two of the rotors has a rotor identification;
the aerial vehicle further comprising:
a memory storing a rescue strategy, such that the aerial vehicle performs the rescue operation based on the rescue strategy in the automatic rescue mode or the automatic rescue-and-return mode;
wherein the rescue strategy includes at least one of:
a first mapping relationship between angles and rotor identifications;
a second mapping relationship between the angles, the rotor identifications, and control amount moduli; or
a third mapping relationship between the angles, the rotor identifications, attribute information, and the control amount moduli, the attribute information including at least one of voltage information of a power supply, weight information of the aerial vehicle, air pressure information of an environment, and a number of times the rescue control instruction is triggered.

11. The aerial vehicle according to claim 1, wherein when the aerial vehicle is in the to-be-rescued attitude:
a projection of a direction of a resultant force of thrusts provided by the one or more first rotors when rotating in the forward direction to a vertical line passing through a center of gravity of the aerial vehicle points to a center of the earth; and/or
propellers of the one or more rotors do not interfere with a landing surface in a current attitude.

12. The aerial vehicle according to claim 1, wherein when the aerial vehicle is able to perform the rescue operation:
propellers of one or more of the at least two rotors are able to rotate in the forward direction or in the reverse direction.

13. The aerial vehicle according to claim 1, wherein when the aerial vehicle is in a normal take-off attitude:
a projection of a direction of a resultant force of thrusts provided by the at least two rotors when rotating in the forward direction on a vertical line passing through a center of gravity of the aerial vehicle is opposite to a direction pointing to a center of the earth; and/or
propellers of the at least two rotors are separated from a landing surface in the current attitude.

14. The aerial vehicle according to claim 1, further comprising:
a communication interface configured to communicate with a control terminal and receive a rescue control instruction transmitted through a communication interface of the control terminal, the rescue control instruction controlling the aerial vehicle to perform the rescue operation.

15. The aerial vehicle according to claim 14, wherein a rescue mode of the aerial vehicle includes at least one of:
a manual rescue mode in which the rescue control instruction includes a control amount modulus, an instruction direction, and a motor rotation instruction input from the control terminal; or
an automatic rescue mode in which the rescue control instruction includes a motor rotation instruction.

16. The aerial vehicle according to claim 15, wherein:
the one or more first rotors are configured to, in the manual rescue mode, provide the second thrust in response to the control amount modulus, the instruction direction, and the motor rotation instruction.

17. The aerial vehicle according to claim 15, wherein:
the aerial vehicle is configured to, in the manual rescue mode, send guidance prompt information to the communication interface of the control terminal through the communication interface of the aerial vehicle, to enable a display screen of the control terminal to display the guidance prompt information for guiding a user to perform the rescue operation.

18. The aerial vehicle according to claim 17, wherein:
the guidance prompt information includes at least one of a schematic image of a stick operation or a parameter value of the stick operation, the schematic image of the stick operation being generated based on the parameter value of the stick operation, and the parameter value of the stick operation being determined based at least on the attitude information of the body.

19. An aircraft rescue method comprising:
receiving a rescue control instruction to rescue an aerial vehicle, the aerial vehicle including a body and at least two rotors rotatably arranged at the body and each configured to provide a first thrust in a first direction when rotating in a forward direction and provide a second thrust in a second direction opposite to the first direction when rotating in a reverse direction;
in response to the body being in a to-be-rescued attitude in which at least one propeller of the at least two rotors interferes with a landing surface, determining whether the at least two rotors are capable of conducting rescue, the determining whether the at least two rotors are capable of conducting rescue comprising determining, for each of the at least two rotors, whether a propeller of the rotor is separated from the landing surface; and
in response to determining that only one or more first rotors of the at least two rotors being capable of conducting rescue, controlling to perform a rescue operation, including controlling the one or more first rotors to provide the second thrust and controlling one or more second rotors of the at least two rotors other than the one or more first rotors to stop rotating, the one or more second rotors being associated with the at least one propeller that interferes with the landing surface.

20. An aircraft rescue system comprising:
an aerial vehicle including:
a body;
at least two rotors rotatably disposed at the body, each of the at least two rotors being configured to provide a first thrust in a first direction when rotating in a forward direction and provide a second thrust in a second direction opposite to the first direction when rotating in a reverse direction; and
at least one processor; and
a control terminal including a communication interface configured to send a rescue control instruction to the aerial vehicle, the rescue control instruction instructing the aerial vehicle to perform a rescue operation when the body is in a to-be-rescued attitude;
wherein the at least one processor is configured to:
in response to the body being in the to-be-rescued attitude in which at least one propeller of the at least two rotors interferes with a landing surface, determine whether the at least two rotors are capable of conducting rescue, the determining whether the at least two rotors are capable of conducting rescue comprising determining, for each of the at least two rotors, whether a propeller of the rotor is separated from the landing surface; and in response to determining that only one or more first rotors of the at least two rotors being capable of conducting rescue, control to perform the rescue operation by controlling the one or more first rotors to provide the second thrust and controlling one or more second rotors of the at least two rotors other than the one or more first rotors to stop rotating, the one or more second rotors being associated with the at least one propeller that interferes with the landing surface.

* * * * *